US010534950B2

(12) United States Patent
Nada et al.

(10) Patent No.: US 10,534,950 B2
(45) Date of Patent: Jan. 14, 2020

(54) DEVICE, METHOD, AND NON-TRANSITORY COMPUTER-READABLE STORAGE MEDIUM FOR BIOMETRIC AUTHENTICATION

(71) Applicant: FUJITSU LIMITED, Kawasaki-shi, Kanagawa (JP)

(72) Inventors: Hajime Nada, Kawasaki (JP); Soichi Hama, Atsugi (JP); Satoshi Maeda, Atsugi (JP); Satoshi Semba, Kawasaki (JP); Yukihiro Abiko, Kawasaki (JP); Rie Hasada, Tama (JP); Toshiaki Wakama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 179 days.

(21) Appl. No.: 15/897,239

(22) Filed: Feb. 15, 2018

(65) Prior Publication Data

US 2018/0239947 A1 Aug. 23, 2018

(30) Foreign Application Priority Data

Feb. 21, 2017 (JP) ................................ 2017-030536

(51) Int. Cl.
*G06K 9/00* (2006.01)
*G06F 3/0488* (2013.01)
*G06F 21/32* (2013.01)

(52) U.S. Cl.
CPC ....... *G06K 9/00026* (2013.01); *G06F 3/0488* (2013.01); *G06F 21/32* (2013.01); *G06K 9/00067* (2013.01)

(58) Field of Classification Search
CPC ............ G06K 9/00026; G06K 9/00067; G06F 3/0488; G06F 21/32
(Continued)

(56) References Cited

U.S. PATENT DOCUMENTS 8,787,622 B2 * 7/2014 Watanabe .......... G06K 9/00342 382/115
2003/0161502 A1 8/2003 Morihara et al.
(Continued)

FOREIGN PATENT DOCUMENTS

JP 2003-248828 9/2003
JP 2003-256816 9/2003
(Continued)

OTHER PUBLICATIONS

Extended European Search Report dated Jun. 26, 2018 for corresponding European Patent Application No. 18157151.4, 8 pages.

*Primary Examiner* — Jonathan S Lee
(74) *Attorney, Agent, or Firm* — Fujitsu Patent Center

(57) ABSTRACT

A method performed by a computer for biometric authentication includes: obtaining, by a processor of the computer, a first image group including a plurality of images that are sequentially captured by a biometric sensor configured to capture at least a part of a region of a body of a user; obtaining, by the processor of the computer, a movement amount of the body and a distance between the body and the biometric sensor; and selecting, by the processor of the computer, a second image group from the first image group in accordance with the movement amount and the distance, the second image group including images to be used in authentication processing with respect to the body, wherein the size of a common region between images to be included in the second image group is adjusted according to the distance.

15 Claims, 26 Drawing Sheets

(58) Field of Classification Search
USPC .......................................................... 382/115
See application file for complete search history.

(56) References Cited

U.S. PATENT DOCUMENTS

| | | | | |
|---|---|---|---|---|
| 2014/0183269 | A1* | 7/2014 | Glaser | G06F 21/32 235/492 |
| 2016/0275334 | A1 | 9/2016 | Hama et al. | |
| 2016/0321496 | A1 | 11/2016 | Mather et al. | |
| 2017/0262687 | A1* | 9/2017 | Maeda | G06K 9/0004 |

FOREIGN PATENT DOCUMENTS

| | | |
|---|---|---|
| JP | 2007-236610 | 9/2007 |
| JP | 2013-105222 | 5/2013 |
| JP | 2013-257609 | 12/2013 |
| JP | 2016-173669 | 9/2016 |

* cited by examiner

| SEPARATION DISTANCE R | THRESHOLD VALUE Th |
| --- | --- |
| R ≦ R1 | Th = Th1 |
| R1 < R ≦ R2 | Th = Th2 |
| R2 < R | Th = Th3 |

DEVICE, METHOD, AND NON-TRANSITORY COMPUTER-READABLE STORAGE MEDIUM FOR BIOMETRIC AUTHENTICATION

CROSS-REFERENCE TO RELATED APPLICATION

This application is based upon and claims the benefit of priority of the prior Japanese Patent Application No. 2017-030536, filed on Feb. 21, 2017, the entire contents of which are incorporated herein by reference.

FIELD

The embodiments discussed herein are related to a device, a method, and a non-transitory computer-readable storage medium for a biometric authentication.

BACKGROUND

Biometric authentication is a technology for identity verification using biometric features and characteristics (also referred to as biometric features), such as fingerprints, faces, and veins. In the biometric authentication, biometric features registered in advance (also referred to as registered biometric features) are collated with biometric features obtained in a scene where confirmation is desired, and the identity verification is performed based on whether or not the biometric authentication matches registered biometric features.

As an information processing apparatus, such as a tablet terminal having a biometric authentication function, there is an information processing apparatus having a function of performing the biometric authentication using biometric information, such as a vein of a palm. When obtaining the biometric information using a non-contact type biometric sensor, in order to make it possible to capture the entire living body, such as a palm, it is desirable to capture the living body after sufficiently ensuring a separation distance between the living body and the biometric sensor (for example, a camera). However, when capturing the living body without using a guide member for keeping the separation distance between the living body and the biometric sensor fixed, the relative position between the biometric sensor mounted on the information processing apparatus and the living body becomes unstable, and the probability of authentication failure regardless of the identity (also referred to as false rejection rate) or the probability of incorrectly accepting others (also referred to as false acceptance rate) is likely to increase. For example, in a case where the information processing apparatus is grasped with one hand and the other hand is a living body, it is generally difficult to suppress the relative position fluctuation (also referred to as posture fluctuation) between the biometric sensor of the information processing apparatus and the living body. The information processing apparatus placed on a desk is also similar thereto.

In the related art, it has been devised that a part of the living body is brought into contact with the information processing apparatus, and thereby suppressing the fluctuation of the relative position between the biometric sensor of the information processing apparatus and the living body.

Examples of the related art include Japanese Laid-open Patent Publication No. 2016-173669, Japanese Laid-open Patent Publication No. 2013-105222, Japanese Laid-open Patent Publication No. 2003-248828, Japanese Laid-open Patent Publication No. 2013-257609, Japanese Laid-open Patent Publication No. 2007-236610, and Japanese Laid-open Patent Publication No. 2003-256816.

SUMMARY

A method performed by a computer for biometric authentication includes: obtaining, by a processor of the computer, a first image group including a plurality of images that are sequentially captured by a biometric sensor configured to capture at least a part of a region of a body of a user; obtaining, by the processor of the computer, a movement amount of the body and a distance between the body and the biometric sensor; and selecting, by the processor of the computer, a second image group from the first image group in accordance with the movement amount and the distance, the second image group including images to be used in authentication processing with respect to the body, wherein the size of a common region between images to be included in the second image group is adjusted according to the distance.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is a view illustrating an example of a relationship between the separation distance and a threshold value;

DESCRIPTION OF EMBODIMENTS

In the related art, by allowing the fingertip of a user to touch a touch panel of the information processing apparatus, the relative positional relationship between a contact position of the fingertip on the touch panel and the biometric sensor of the information processing apparatus can be uniquely determined. Therefore, it is possible to suppress fluctuation of the relative position between the hand that serves as a living body and the biometric sensor of the information processing apparatus to a certain extent.

However, even when a part of the living body is brought into contact with the information processing apparatus, since the living body is in a state of non-contact with the biometric sensor in the capturing range of the non-contact type biometric sensor, it is difficult to suppress the fluctuation of the separation distance between the living body and the biometric sensor.

In addition, in a state where a part of the living body is brought into contact with the information processing apparatus, it is difficult to capture the entire living body from the non-contact type biometric sensor mounted on the information processing apparatus. Therefore, when the biometric information is input, the living body is partially captured at a plurality of points of time while moving the living body. However, as capturing conditions, such as the moving speed of the living body and the separation distance for each input of the biometric information, fluctuate, the region of the living body included in the capturing range of the biometric sensor can vary.

As described above, since capturing conditions of the living body can vary depending on the input of biometric information at the time of registration and the input of biometric information at the time of collation, the region of the living body captured with the image obtained at the time of registration and the image obtained at the time of collation can vary. Therefore, a deviation can occur between the images at the time of registration and the images at the time of collation.

According to an aspect of the present disclosure, provided are technologies for suppressing the influence on the authentication accuracy due to the fluctuation of the capturing conditions, such as the separation distance or the moving speed of the living body with respect to the biometric sensor.

Hereinafter, embodiments will be described with reference to the drawings. A configuration of the embodiment is an example and is not limited to the configuration of the embodiment.

EXAMPLE 1

Figure 1:
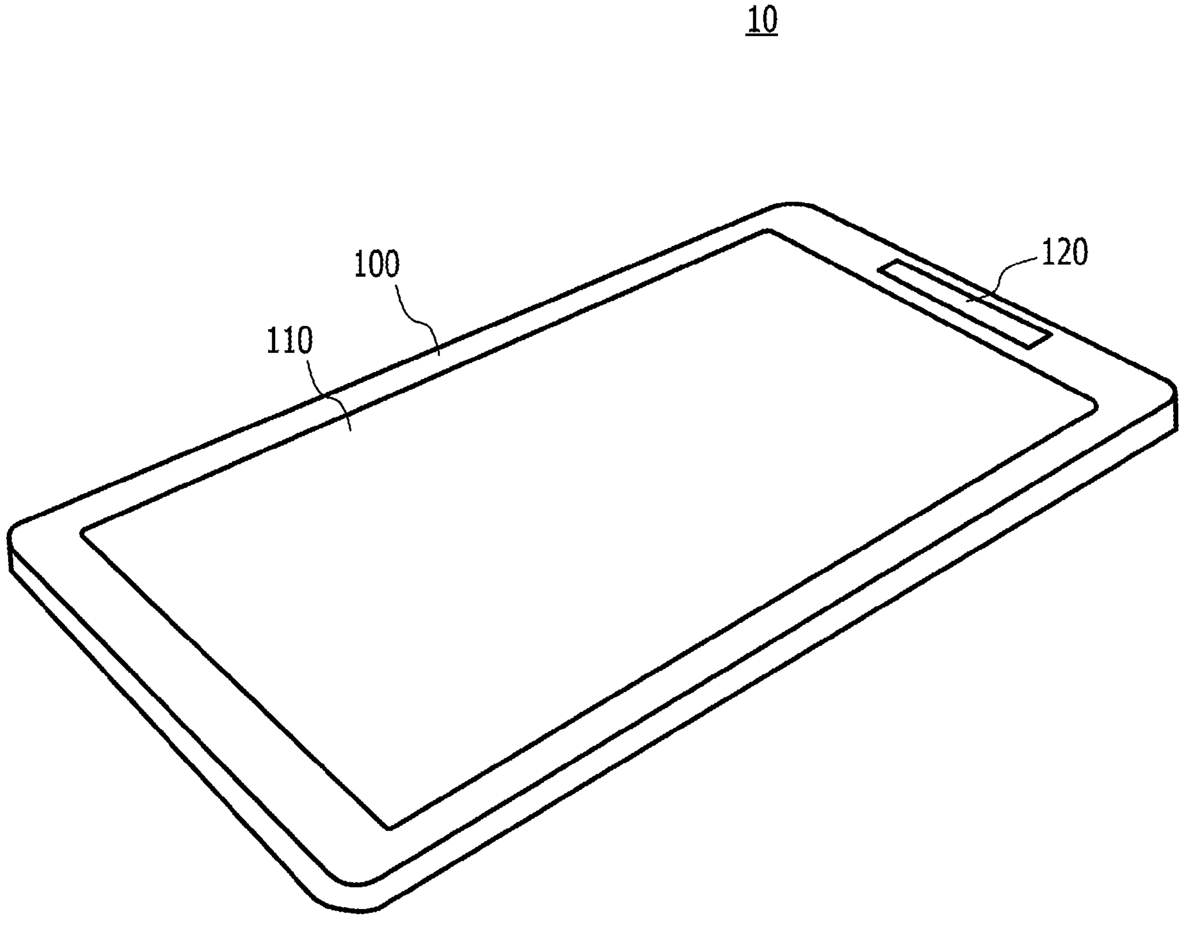
FIG. 1 is a perspective view illustrating an example of an appearance of an information processing apparatus having a biometric authentication function.

FIG. 1 is a perspective view illustrating an example of an appearance of an information processing apparatus 10 having a biometric authentication function. The information processing apparatus 10 illustrated in FIG. 1 includes a main body 100, a touch panel display 110, and a non-contact type biometric sensor 120. The main body 100 is a housing for accommodating various components, such as a touch panel display 110 and a non-contact type biometric sensor 120, and in the example illustrated in FIG. 1, the main body 100 has a size large enough to allow a user to grasp and carry by hand.

The touch panel display 110 is a device in which sensors for touch operation detection (also referred to as touch sensors) and the like are integrated on various displays, such as a liquid crystal display or an electroluminescence panel, and detects the position of a finger or a pen which is in contact with the screen. A coordinate value of the detected position is supplied to a processor of the information processing apparatus 10. In other words, the touch panel display 110 illustrated in FIG. 1 has an aspect as a display device and an aspect as an input device, and a graphical user interface (GUI) or the like that accepts an operation of a user or the like can be displayed. The touch panel display 110 is also referred to as a touch panel, a touch display, a touch screen, a touch liquid crystal, a touch panel monitor, or the like.

The non-contact biometric sensor 120 (hereinafter also referred to as biometric sensor) is an image sensor that obtains an image of a living body in a non-contact manner, and is, for example, a complementary metal oxide semiconductor (CMOS) camera or the like. For example, the biometric sensor 120 may be configured to obtain an image of a surface of the living body, or may be configured to obtain images of the living body of subcutis, such as a vein pattern, by using near infrared rays. Examples of the living bodies captured by the biometric sensor 120 include fingers of a hand or the palm of a hand.

In the example illustrated in FIG. 1, the biometric sensor 120 is disposed in the vicinity of the touch panel display 110. Therefore, for example, the information processing apparatus 10 detects that the finger of the user has touched a region positioned in the vicinity of the biometric sensor 120 in the region on the touch panel display 110, and accordingly, the information processing apparatus 10 can obtain an image of the palm of the hand of the user that serves as the living body by the biometric sensor 120.

Figure 2:
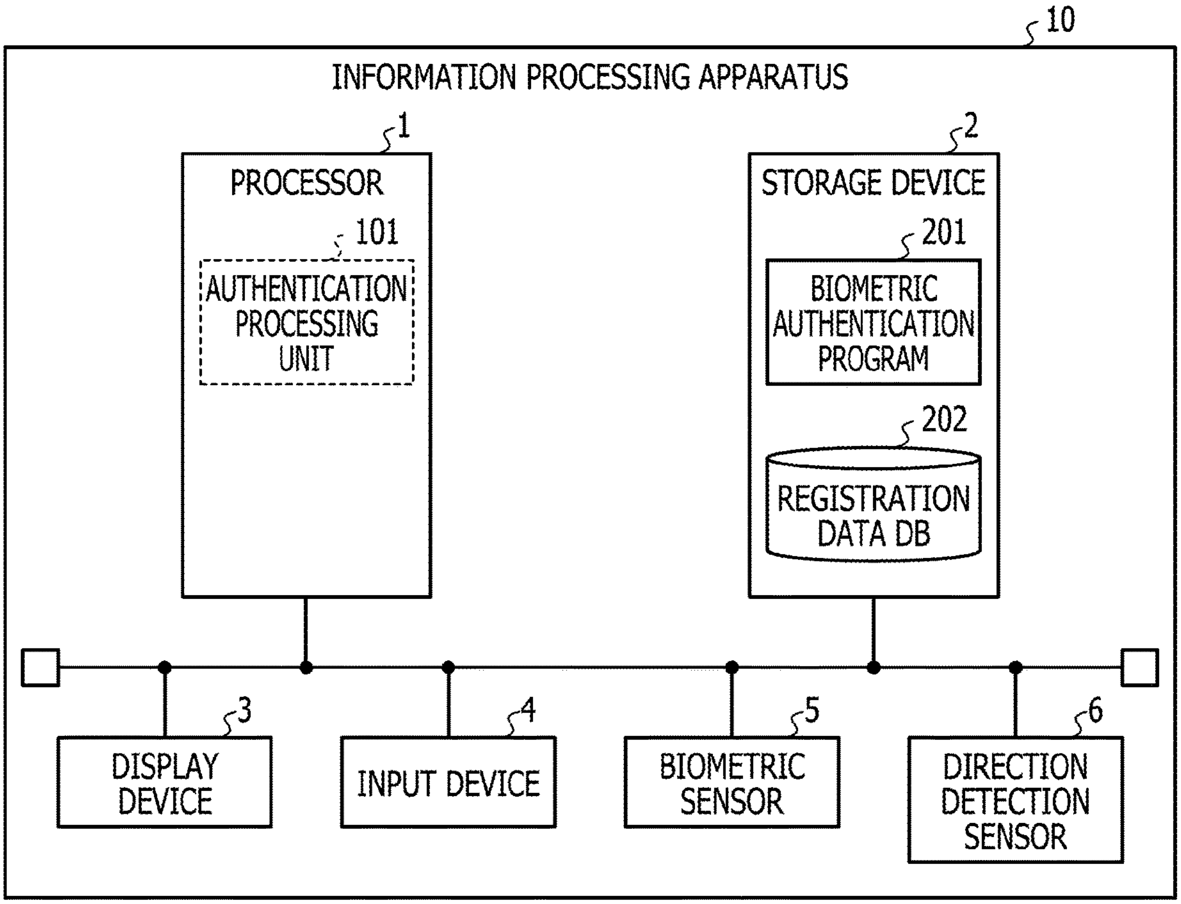
FIG. 2 is a view illustrating an example of a hardware configuration of the information processing apparatus.

FIG. 2 is a view illustrating an example of a hardware configuration of the information processing apparatus 10. The information processing apparatus 10 illustrated in FIG. 2 includes a processor 1, a storage device 2, a display device 3, an input device 4, a biometric sensor 5, and a direction detection sensor 6. In FIG. 2, the various devices included in the information processing apparatus 10 are connected to each other to be capable of communicating with each other via an internal bus. In addition, the connection form between the devices illustrated in FIG. 2 is an example, and may be appropriately designed and changed.

The processor 1 is a circuit which realizes the operation that serves as an authentication processing unit 101 according to the Example 1 by executing various programs, such as the biometric authentication program 201, stored in the storage device 2 (also called memory). In other words, by executing the biometric authentication program 201 stored in the storage device 2, the processor 1 is appropriately converted into a hardware circuit that executes the processing of the authentication processing unit 101. Examples of such a processor 1 include a central processing unit (CPU), a micro processing unit (MPU), a digital signal processor (DSP), a field programmable gate array (FPGA), and the like. The processor 1 is an example of processing unit for executing various types of processing according to the Example 1. In addition, the processor 1 may be a multi-core processor including two or more cores.

The authentication processing unit 101 illustrated in FIG. 2 has a function of executing processing related to the biometric authentication using an image (also referred to as a biological image) obtained by the biometric sensor. The authentication processing unit 101 is configured to execute processing for changing the size of the common region between the images selected as the second image group in accordance with the separation distance of the living body with respect to the biometric sensor (also referred to as authentication processing) with respect to the information processing apparatus 10 when selecting the second image group to be used for authentication of the living body, based on the movement amount of the living body, from the first image group which is sequentially captured together with the movement of the region of the living body that serves as a capturing target in the biometric sensor that can capture at least a part of the region of the living body. For example, when selecting the second image group based on the movement amount of the living body, a threshold value with respect to the movement amount of the living body is determined based on the separation distance of the living body with respect to the biometric sensor, and the second image group may be selected by using the threshold value based on the separation distance. The movement amount of the living body has an aspect which is a change amount of the relative position of the living body with respect to the biometric sensor. In other words, the movement amount of the living body may be a movement amount in a case where the living body or any one of the biometric sensors is substantially fixed at a predetermine position, and the other one is moved. Otherwise, the movement amount may be a movement amount in a case where the relative position of the living body with respect to the biometric sensor is changed by moving both of the living body and the biometric sensor with different movement amounts. These are examples of the movement amount of the living body.

The use of the threshold value when selecting the image has an aspect of comparing the movement amount of the living body with the threshold value based on the separation distance and controlling whether to select the image according to the comparison result. In addition, as will be described later, the movement amount of the living body may be measured by another sensor, or may be measured based on the position displacement of the common region between the images.

For example, the threshold value in the authentication processing unit 101 has an aspect in which the second image group is selected so that, for example, as the separation distance of the living body with respect to the biometric sensor becomes greater, the common region of the living body among the plurality of images in the second image group becomes greater. In other words, the authentication processing unit 101 selects an image so that the common region between the images selected as the second image group becomes greater as the separation distance of the living body with respect to the biometric sensor becomes greater when selecting the second image group used in authentication of the living body, based on the movement amount of the living body, from the first image group which is sequentially captured together with the movement of the region of the living body that serves as a capturing target in the biometric sensor that can capture at least a part of the region of the living body. According to another point of view, the threshold value in the authentication processing unit 101 has an aspect in which the second image group is selected so that, for example, as the separation distance of the living body with respect to the biometric sensor becomes greater, the number of images in the second image group selected from the first image group becomes greater. These aspects are useful for suppressing the influence on the authentication accuracy by the fluctuation of the capturing conditions as will be described later.

The storage device 2 is a device which stores and holds various programs, such as the biometric authentication program 201 executed by the processor 1, a registration data base (DB) 202 for storing registration data used for collation of the biometric features, a reference data or data to be written when the processor 1 is processed, or the like. The storage device 2 is configured to include both of or at least one of a nonvolatile storage device and a volatile storage device. For example, a random access memory (RAM), a read only memory (ROM), a solid state drive (SSD), a hard disk drive (HDD), and the like. In the disclosure, the storage device 2 is a generic term for various storage devices, such as a main storage device and an auxiliary storage device.

The display device 3 is configured to display the processing result or the like of the biometric authentication program 201 executed by the processor 1. For example, a liquid crystal display (LCD), an organic electro luminescence (OEL) display, an organic light emitting diode (OLED) display, and the like can be employed.

The input device 4 is configured to output an input signal that corresponds to an input operation by a user, to the processor 1. In the example of FIG. 2, only one input device 4 is illustrated, but the information processing apparatus 10 may have a plurality of input devices 4. For example, the information processing apparatus 10 includes an input device configured to output a signal for switching on and off of a power source of the information processing apparatus 10 in response to an input operation of the user; an input device configured to include a sensor that detects the contact of the finer of the user or the pen, and to supply coordinate values indicating the contacted position to the processor 1.

The display device 3 and the input device 4 illustrated in FIG. 2 correspond to the touch panel display 110 illustrated in FIG. 1.

In the following disclosure, the display device 3 and the input device 4 exemplified in FIG. 2 are collectively referred to as the touch panel display 110.

The biometric sensor 5 is an image sensor configured to obtain an image of the living body in a non-contact manner, and corresponds to the biometric sensor 120 illustrated in FIG. 1. The biometric sensor 5 includes, for example, a light emitting device, such as a light emitting diode (LED) that irradiates near infrared light for irradiating the palm, and a capturing device, such as a complementary metal oxide semiconductor (CMOS) camera formed by using two-dimensional array of capturing elements having sensitivity with respect to near infrared light. The biometric sensor 5 is configured to supply an image generated by capturing at least a partial region of the living body to the processor 1 indirectly via the storage device 2 or directly without passing through the storage device 2. In the following disclosure, the biometric sensor 5 is also referred to as the biometric sensor 120.

The direction detection sensor 6 is a sensor for detecting the orientation of the information processing apparatus 10 with respect to the user, and examples thereof include an acceleration sensor and a gyro sensor. Based on a signal from the direction detection sensor 6, the processor 1 is configured so as to be able to detect which side is the upper side with the screen of the display device 3 of the information processing apparatus 10 as a front surface. In other words, the processor 1 is configured to be able to detect in which direction the biometric sensor 120 of the information processing apparatus 10 is positioned with respect to the touch panel display 110, based on a signal from the direction detection sensor 6.

Figure 3:
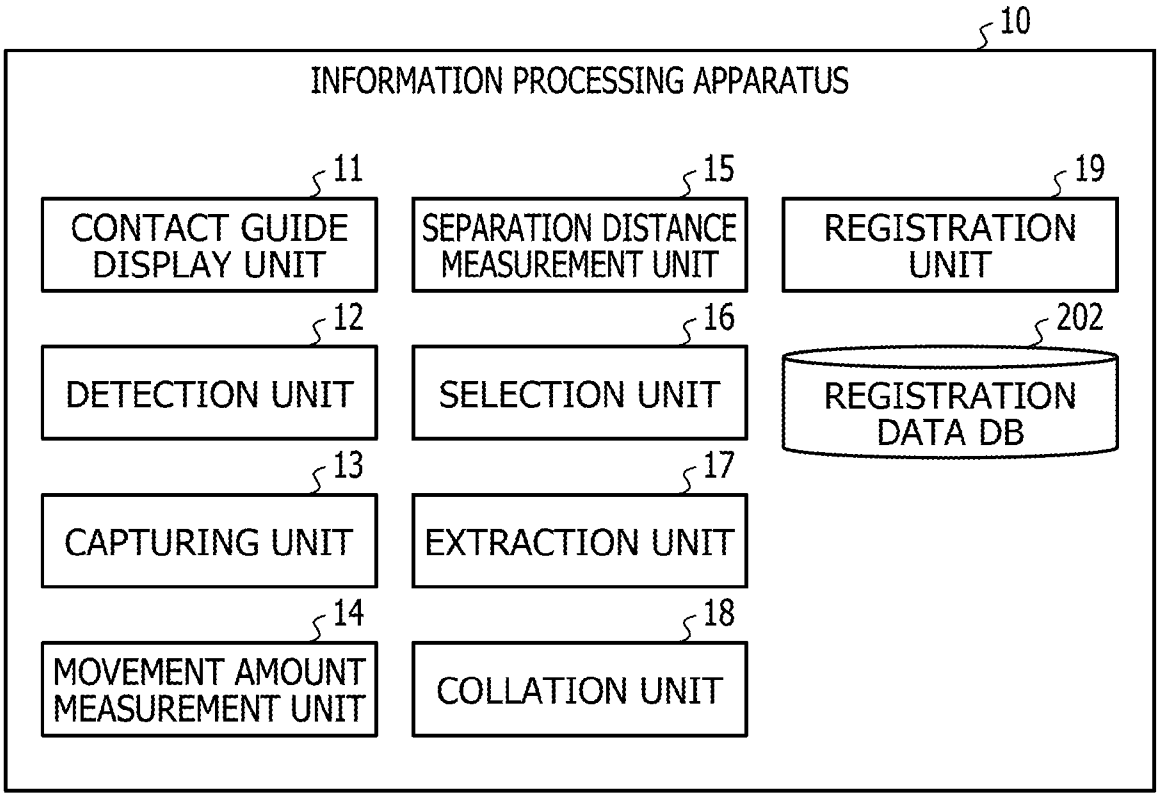
FIG. 3 is a block diagram illustrating an example of a functional configuration of the information processing apparatus according to Example 1.

FIG. 3 is a block diagram illustrating an example of a functional configuration of the information processing apparatus 10 according to Example 1. In other words, the functional configuration illustrated in FIG. 3 is an example of a functional configuration in which processing by the authentication processing unit 101 (also referred to as authentication processing) is detailed. The information processing apparatus 10 illustrated in FIG. 3 includes a contact guide display unit 11, a detection unit 12, a capturing unit 13, a movement amount measurement unit 14, a separation distance measurement unit 15, a selection unit 16, an extraction unit 17, a collation unit 18, and a registration unit 19, as functional configurations realized by the authentication processing unit 101. Various functional units of the information processing apparatus 10 illustrated in FIG. 3 are realized, for example, by executing the biometric authentication program 201 stored in the storage device 2 by the processor 1 of the information processing apparatus 10. In other words, by executing the biometric authentication program 201 stored in the storage device 2, the processor 1 of the information processing apparatus 10 is converted into a hardware circuit realizing each of the functional units illustrated in FIG. 3. In addition, in FIG. 3, the registration data DB 202 is illustrated as a database to be referred and written by the authentication processing unit 101.

The contact guide display unit 11 is configured to cause the information processing apparatus 10 to execute processing (also referred to as contact guide display processing) for displaying a contact guide on the touch panel display 110 indicating a position at which a part of the living body is to be brought into contact. The detection unit 12 is configured to cause the information processing apparatus 10 to execute processing (also referred to as detection processing) for detecting the contact position of the living body with respect to the touch panel display 110. The capturing unit 13 is configured to cause the information processing apparatus 10 to execute processing (also referred to as capturing processing) for obtaining an image of a capturing range including at least a part of the living body which is captured at a plurality of points of time within a moving period during which the contact position of the living body moves along a contact guide route on the touch panel display 110. The movement amount measurement unit 14 is configured to cause the information processing apparatus 10 to execute processing (also referred to as movement amount measurement processing) for measuring the movement amount indicating the amount of movement of the living body along the contact guide route. The separation distance measurement unit 15 is configured to cause the information processing apparatus 10 to execute processing (also referred to as separation distance measurement processing) for measuring the separation distance of the living body in the moving period. In a case where the movement amount between two different points in the moving period exceeds a threshold value based on the separation distance, the selection unit 16 is configured to the information processing apparatus 10 to execute processing (also referred to as selection processing) for selecting images that correspond to each of the two points of time among the images obtained by the capturing unit 13. The extraction unit 17 is configured to cause the information processing apparatus 10 to execute processing (also referred to as extraction processing) for extracting the biometric features from the image (also referred to as selected image) selected by the selection unit 16. The collation unit 18 is configured to cause the information processing apparatus 10 to execute processing (also referred to as collation processing) for performing the biometric authentication using the biometric features extracted from the selected image, during operation in a collation mode. The registration unit 19 is configured to cause the information processing apparatus 10 to execute processing (also referred to as registration processing) for registering the biometric features extracted from the selected image in the registration data DB 202 in association with the information related to the separation distance of the living body at the time of capturing the selected image, during operation in a registration mode.

Figure 4:
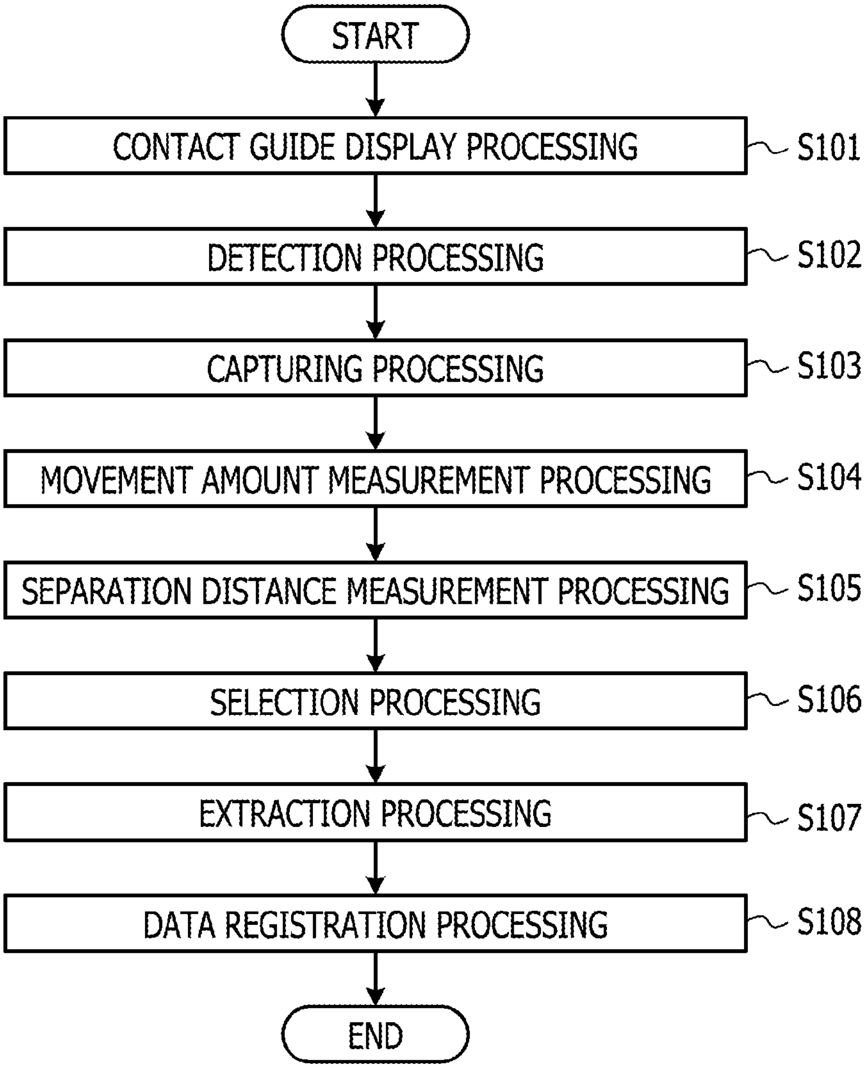
FIG. 4 is a view illustrating an example of a flow of processing in a registration mode.

FIG. 4 is a view illustrating an example of a flow of processing in the registration mode in which biometric features are registered in the registration data DB. The flow of the processing in the registration mode illustrated in FIG. 4 may start processing, for example, in a registration mode that is a mode of registering biometric features in the registration data DB 202, triggered by the execution of the biometric authentication program 201. The instruction operation that the biometric authentication program 201 ought to start execution in the registration mode may receive an instruction from the user by a touch operation on an icon displayed on the touch panel display 110, for example. In addition, a part or the entirety of processing illustrated in FIG. 4 may be executed in accordance with an event driven method of starting up processing while being initiated and waiting for a predetermined event and triggering detection of a predetermined event. It is desired to be noted that, in a case of execution in accordance with the event driven method, the processing can be executed in an order different from the processing flow illustrated in FIG. 4.

First, the processor 1 executes contact guide display processing for displaying the contact guide on the touch panel display 110 indicating the position at which the living body is to be brought into contact (S101). In step S101, the processor 1 may determine whether the biometric sensor 120 is positioned on the right side or on the left side with respect to the touch panel display 110 based on the signal from the direction detection sensor 6. In the processing S101, the processor 1 may display the contact guide for the right hand in a case where the biometric sensor 120 is positioned on the right side, and displays the contact guide for the left hand when the biometric sensor 120 is positioned on the left side, based on the determination result.

Figure 5:
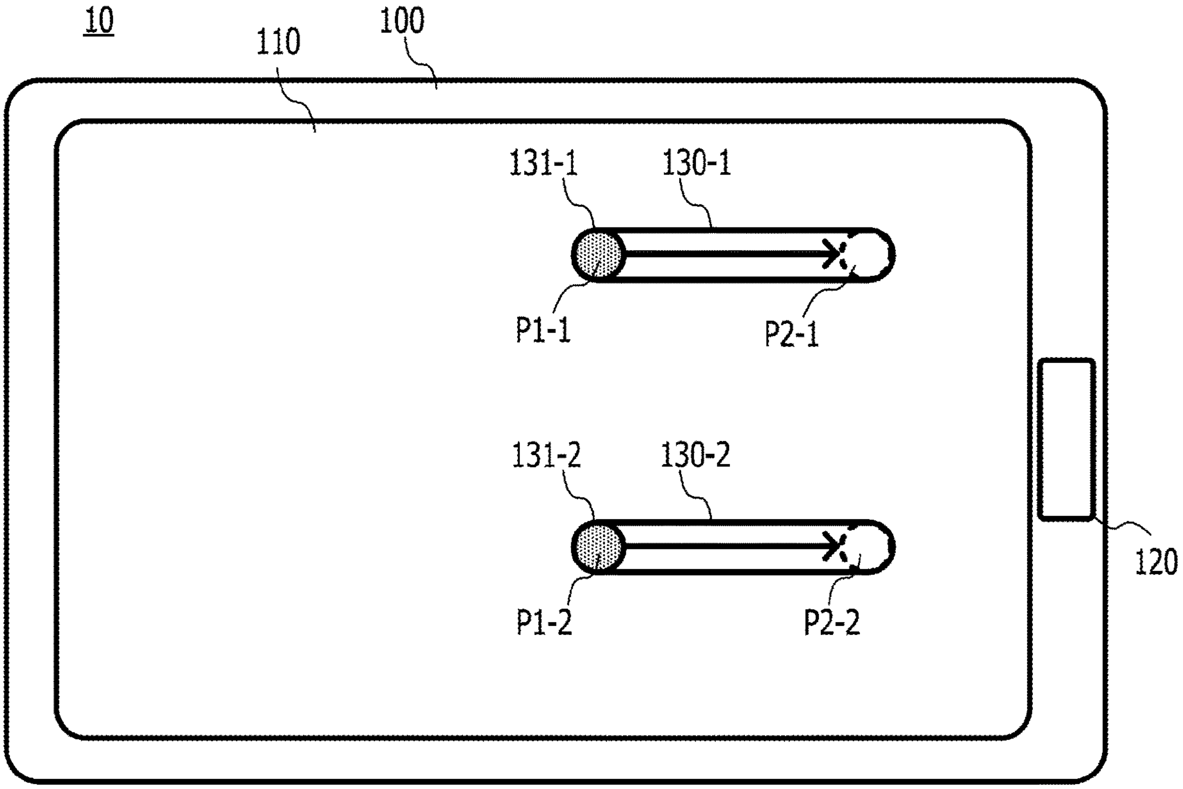
FIG. 5 is a view illustrating an example of a display of a contact guide.

FIG. 5 is a view illustrating an example of the display of the contact guide. In the example of FIG. 5, since the biometric sensor 120 is positioned on the right side of the screen of the touch panel display 110 provided in the information processing apparatus 10, the contact guides 131-1 and 131-2 for the right hand are displayed on the touch panel display 110. In accordance with the operation of the user, the contact guides 131-1 and 131-2 are GUI configured to be capable of moving from start points P1-1 and P1-2 to end points P2-1 and P2-2 along the contact guide routes 130-1 and 130-2. The user brings the fingertip of the right hand into contact with the position indicated by the contact guides 131-1 and 131-2 and drags the contact guides 131-1 and 131-2 along the contact guide routes 130-1 and 130-2, and accordingly, it is possible to move the contact guides 131-1 and 131-2 from the start points P1-1 and P1-2 to the end points P2-1 and P2-2.

The contact guides 131-1 and 131-2 for the right hand illustrated in FIG. 5 are displayed on the touch panel display 110 such that the biometric sensor 120 is positioned to be closer to the contact guide 131-2 than the middle between the contact guide 131-1 and the contact guide 131-2. This means that the index finger of the right hand is brought into contact with the position indicated by the contact guide 131-1 and the thumb of the right hand (note that the thumb is generally shorter than the index finger) is brought into contact with the position indicated by the contact guide 131-2. In other words, by displaying the contact guide 131-2 indicating the position to be touched by the thumb of the right hand to be closer to the biometric sensor 120 than the contact guide 131-1 indicating the position to be touched by the index finger of the right hand, the palm of the right hand is expected to be easily captured. When displaying the contact guide for the left hand, the display contents may be inverted horizontally with the center of the touch panel display 110 as the base point. However, the disclosure is not limited to the example illustrated in FIG. 5, and the position of the palm of the right hand determined by the positional relationship between the index finger and the thumb may be appropriately changed so as to be included in the capturing range of the biometric sensor 120.

Figure 6:
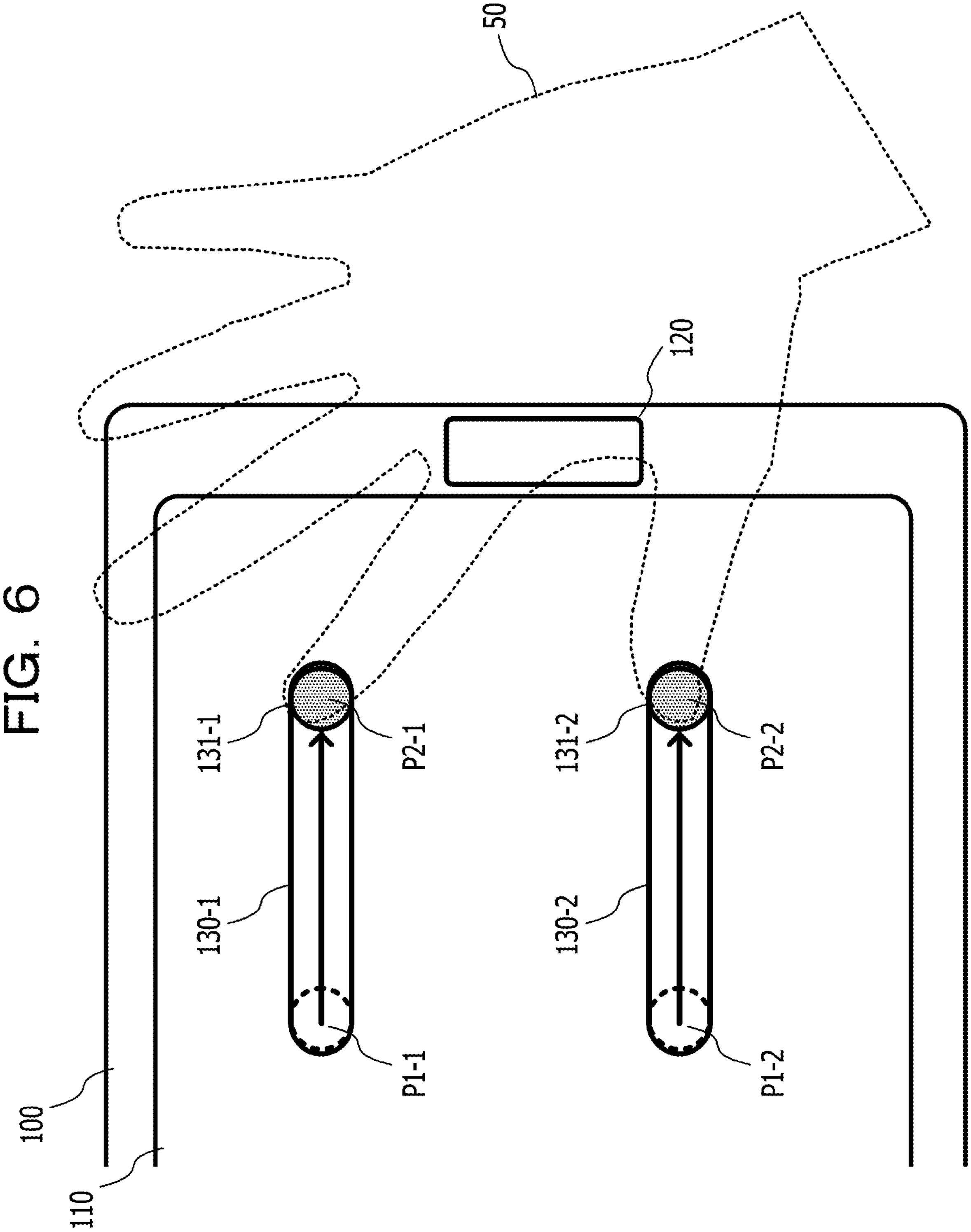
FIG. 6 is a view illustrating an example of a state where a contact position of a living body is moved along a contact guide route.

FIG. 6 is a view illustrating an example of a state where the contact position of the living body is moved along the contact guide route. In the example illustrated in FIG. 6, as a living body 50, the fingertip of the right hand of the user comes into contact with the touch panel display 110. For example, the index finger of the right hand comes into contact with the position indicated by the contact guide 131-1, and the thumb of the right hand comes into contact with the position indicated by the contact guide 131-2. In this manner, in a state where the fingertip of the right hand is brought into contact with the position indicated by the contact guides 131-1 and 131-2, by moving the contact guides 131-1 and 131-2 along the contact guide routes 130-1 and 130-2 from the start points P1-1 and P1-2 to the end points P2-1 and P2-2, the palm of the right hand that serves as the living body 50 passes through the capturing range of the biometric sensor 120.

The description returns to the description of FIG. 4. The processor 1 executes the detection processing for detecting the contact position of the living body 50 with respect to the touch panel display 110 (S102). Here, the term "contact position" is used as a concept including a point or a region that corresponds to a place where the living body (for example, the fingertip of the right hand) comes into contact with the touch panel display 110. In processing S102, the processor 1 may detect the contact position of the living body 50 by obtaining the coordinate value indicating the contact position on the touch panel display 110 based on an input signal from the touch panel display 110. The contact position of the living body 50 is indicated by coordinate values in a two-dimensional coordinate system with the vertical direction of the touch panel display 110 as the Y axis and the horizontal direction as the X axis in the state illustrated in FIG. 5, for example. In a case where the contact position is a region including a plurality of pixels (also referred to as a contact region), the coordinate value indicating the contact position may be a coordinate value that corresponds to the center of gravity of the contact region, may be a coordinate value that corresponds to any pixel within the contact region, or may be a coordinate value that corresponds to a pixel at the upper left of a rectangular region including the contact region. In the example illustrated in FIG. 4, although the processing S101 and the processing S102 are illustrated so as to be executed before and after the passage of time, these steps of processing may be executed in parallel. The other processing illustrated in FIG. 4 is also similar thereto.

The processor 1 executes the capturing processing for obtaining an image of at least a part of the capturing range of the living body 50 captured by the biometric sensor 120 at a plurality of points of time within the moving period in which the contact position of the living body 50 moves along the contact guide route on the touch panel display 110 (S103). In other words, the capturing processing (S103) has an aspect of obtaining the first image group sequentially captured along with the movement of the region of the living body that serves as the capturing target in the biometric sensor, by the relative movement of the living body with respect to the biometric sensor. For example, the first image group can include a plurality of images which are continuously captured along with the movement of the living body included in the capturing range of the biometric sensor.

In processing S103, the processor 1 may use a predetermined time interval as a plurality of points of time at which the living body 50 is captured within the moving period, or may use a point of time determined in accordance with the movement amount of the living body 50. The movement amount of the living body 50 will be described later. In addition, in processing S103, the processor 1 may store the image captured by the biometric sensor 120 in the storage device 2 in association with the supplementary information including the coordinate value of the contact position of the living body obtained in the detection processing (S102). In other words, each of the images in the image group obtained by continuously capturing the living body is associated with the supplementary information including the coordinate value of the contact position at each point of capturing time. The supplementary information may include a time stamp indicating the date and time or the time that correspond to the point of time at which the biometric sensor 120 captured the image. Here, the storage device 2 may be a cache memory, a volatile storage device, such as a RAM (also referred to as a main storage device), or a nonvolatile storage device, such as an HDD or an SSD (also referred to as an auxiliary storage device).

In the processing S103, the captured image stored in association with the supplementary information may be binarized. This may be generated as a binarized image at the time of being captured by the biometric sensor 120, or may be converted into a binarized image from the image captured by the biometric sensor 120 by processing in the processor 1.

Figure 7:
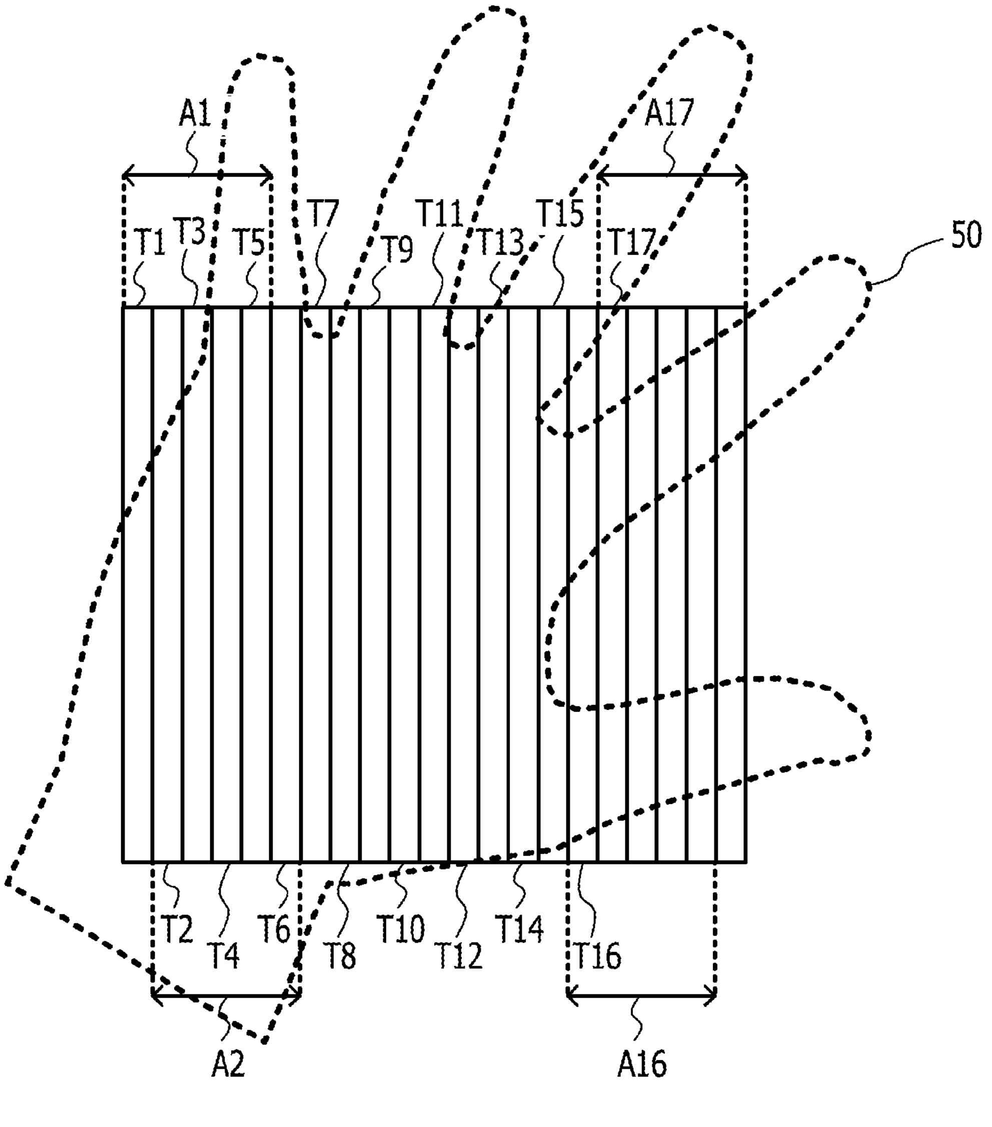
FIG. 7 is a view illustrating an example of a capturing range of the living body.

FIG. 7 is a view illustrating an example of the capturing range of the living body, and is illustrated in a state where the palm side of the right hand that serves as the living body faces the front. In other words, FIG. 7 is a view of the palm seen from the biometric sensor 120 in FIG. 6. In other words, the thumb of the right hand is illustrated facing the right side. In the example of FIG. 7, images of the capturing ranges A1 to A17 are captured at a plurality of points of time T1 to T17 in the moving period during which the contact position of the living body 50 moves along the contact guide route. In addition, in the disclosure, it is desired to be noted that the number of times of capturing in the moving period is not limited to 17 times indicated by the points of time T1 to T17, and FIG. 7 is an example.

In the example illustrated in FIG. 7, the width in the X-axis direction indicated by the arrows of the capturing ranges A1 to A17 is a width that depends on the number of pixels in the X-axis direction of the capturing elements mounted on the biometric sensor 120, and any of the widths is substantially the same as each other. At the point of time T1, an image of the capturing range having the width illustrated by the arrow of the capturing range A1 is captured. At the point of time T2, an image of the capturing range having the width illustrated by the arrow of the capturing range A2 is captured. Similarly, images of the capturing ranges A3 to A17 are captured for the points of time T3 to T17, respectively. In addition, in the example of FIG. 7, illustration of the capturing ranges A3 to A15 is omitted for the convenience of explanation.

Figure 8:
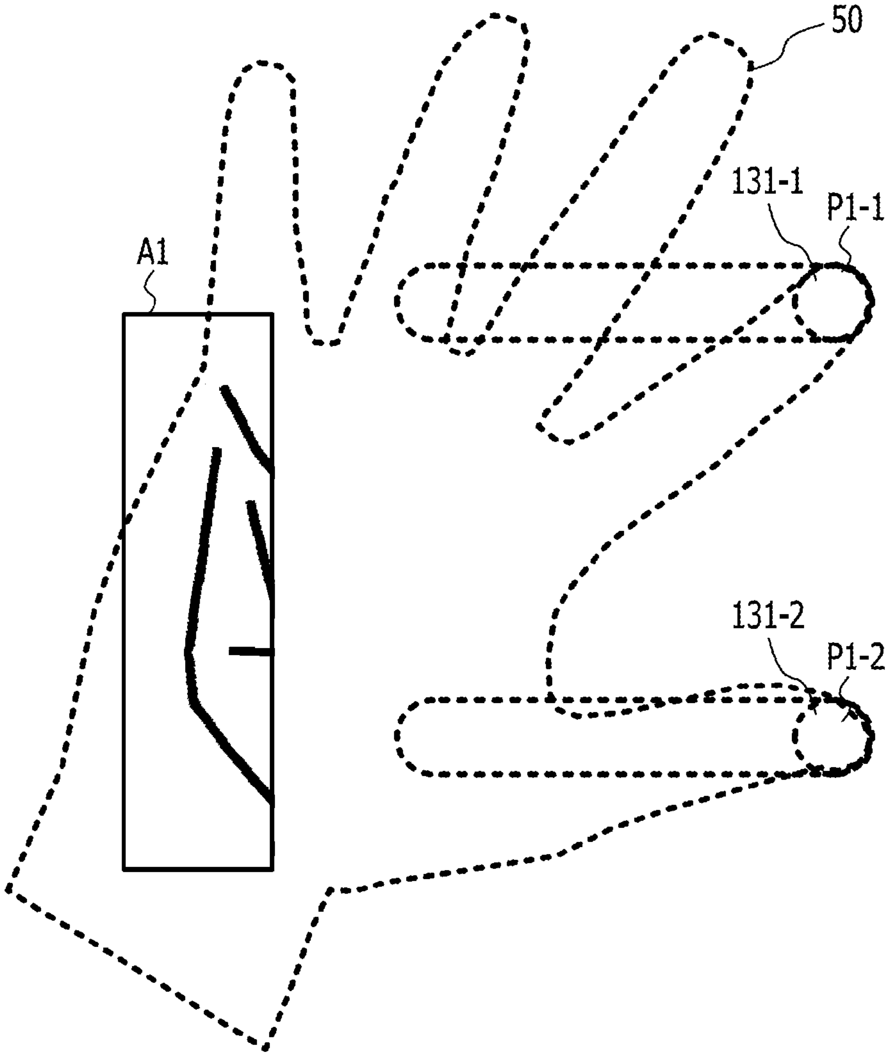
FIG. 8 is a view illustrating an example of a relative positional relationship between the capturing range of the living body and the contact position.

FIG. 8 is a view illustrating an example of a relative positional relationship between the capturing range of the living body and the contact position, and is illustrated in a state where the palm side of the right hand that serves as the living body faces the front. In other words, FIG. 8 is a view of the palm seen from the biometric sensor 120 similar to FIG. 7. In the example of FIG. 8, the right index finger is brought into contact with the contact guide 131-1 displayed at the start point P1-1 and the thumb of the right hand is brought into contact with the contact guide 131-2 displayed at the start point P1-2. In the state illustrated in FIG. 8, the region of the palm of the right hand illustrated in the capturing range A1 is included in the capturing range of the biometric sensor 120. The capturing range A1 illustrated in FIG. 8 corresponds to the capturing range A1 at the point of time T1 illustrated in FIG. 7.

Figure 9:
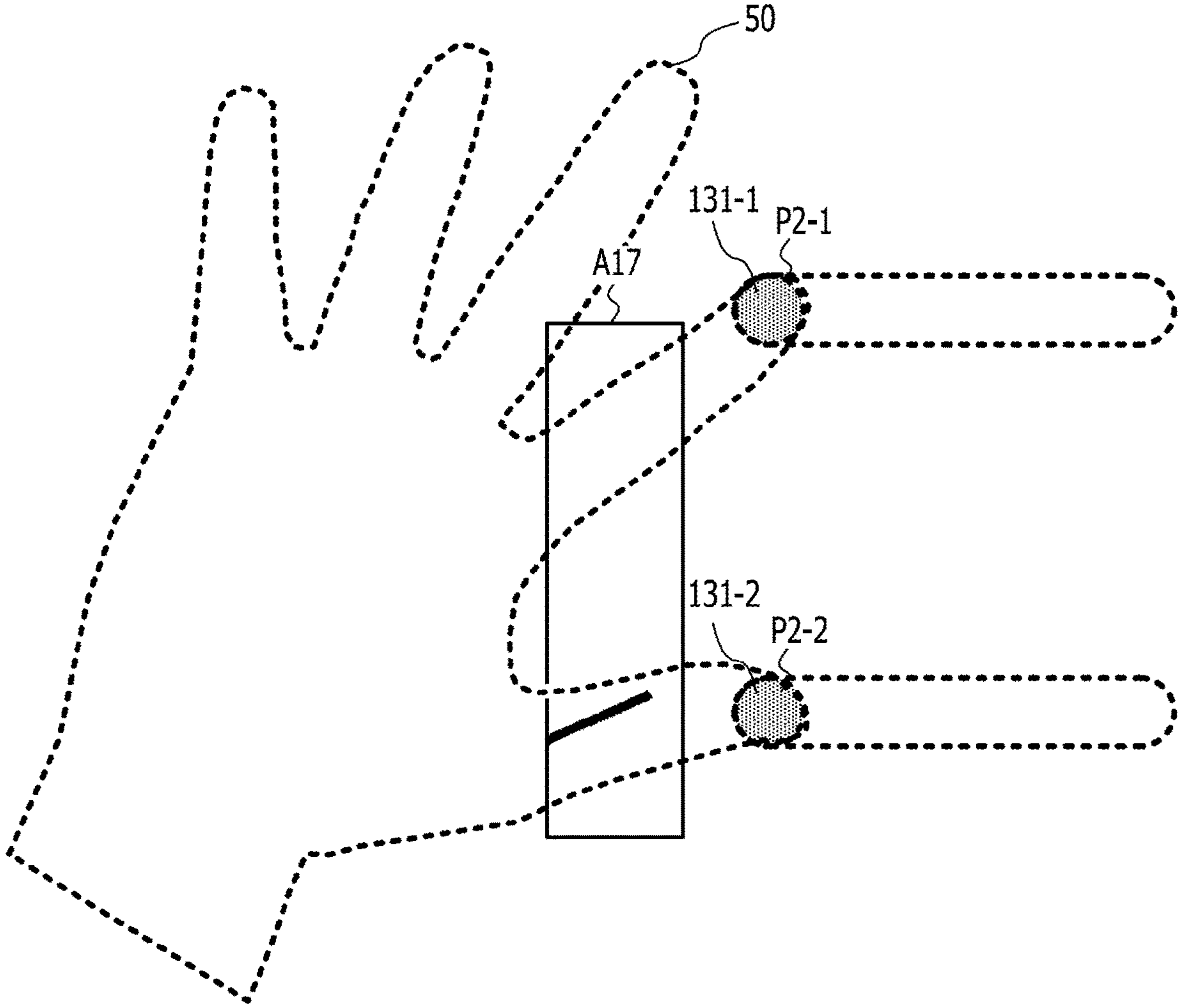
FIG. 9 is a view (second) illustrating an example of the relative positional relationship between the capturing range of the living body and the contact position.

FIG. 9 is a view (second) illustrating an example of a relative positional relationship between the capturing range of the living body and the contact position, and is illustrated in a state where the palm side of the right hand that serves as the living body faces the front, similar to FIG. 8. In other words, FIG. 9 is a view of the palm seen from the biometric sensor 120 similar to FIGS. 7 and 8. In the example of FIG. 9, the right index finger is brought into contact with the contact guide 131-1 displayed at the end point P2-1 and the thumb of the right hand is brought into contact with the contact guide 131-2 displayed at the end point P2-2. In the state illustrated in FIG. 9, the region of the palm of the right hand illustrated in the capturing range A17 is included in the capturing range of the biometric sensor 120. The capturing range A17 illustrated in FIG. 9 corresponds to the capturing range A17 at the point of time T17 illustrated in FIG. 7.

The description returns to the description of FIG. 4. The processor 1 executes the movement amount measurement processing for measuring the movement amount which indicates the amount of movement of the living body along the contact guide route (S104). In the processing S104, the processor 1 may measure the movement amount (first movement amount) of the living body using the contact position of the living body indicated by the supplementary information associated with the image obtained in the capturing processing (S103). In measurement of the first movement amount, the processor 1 may refer to the supplementary information (t) associated with the image (t) obtained in the capturing processing (S103) at a certain point of time t, and may ascertain the contact position (t) of the living body indicated by the supplementary information (t). In addition, in the measurement of the first movement amount, the processor 1 may refer to the supplementary information (t-1) associated with the image (t-1) obtained in the capturing processing (S103) at a previous point of time t-1, and may ascertain the contact position (t-1) of the living body indicated by the supplementary information (t-1). The processor 1 may measure the first movement amount at a point of time t, for example, based on the difference between the contact position (t) and the contact position (t-1). As described above, an example of the contact position of the living body indicated by the supplementary information is a coordinate value that indicates the contact position of the living body obtained in the detection processing (S102). The contact position of the living body obtained in the detection processing (S102) is changed, for example, by the contact guides 131-1 and 131-2 moving according to the drag operation by the user. In the first measurement, the processor 1 may obtain the first movement amount by measuring the change amount (also referred to as displacement) of the contact position on the coordinate axis (also referred to as the X axis) in the lateral direction which is the moving direction of the contact guide. In other words, the processor 1 may measure the first movement amount at the point of time t using the difference between the X coordinate value of the contact position (t) and the X coordinate value of the contact position (t-1). In the processing S104, the processor 1 may include the first movement amount in the supplementary information associated with the image at the point of time t.

In addition, the processor 1 may measure the movement amount (also referred to as a second movement amount) of the living body using the movement amount of the pixel included in the image obtained in the capturing processing (S103) in the processing S104. In the measurement of the second movement amount, the processor 1 compares the image (t) obtained in the capturing processing (S103) at a certain point of time t and the image (t-1) obtained in the capturing processing (S103) at the previous point of time t-1 to each other, and searches for a common region which is a region including pixels common to both images. The processor 1 may obtain the second movement amount at the point of time t based on a difference between the position of the common region in the image (t) and the position of the common region in the image (t-1). In searching for the common region between images, a known algorithm may be used. For example, while moving the image (t-1) in the horizontal and vertical directions with respect to the image (t) in a unit of one pixel and performing correlation calculation on the overlapping region, an evaluation value for the overlapping region may be obtained, and a region of which the evaluation value is a peak value may be specified as a common region. This method is detailed in Japanese Laid-open Patent Publication No. 2003-248828. In the processing S104, the processor 1 may include the second movement amount in the supplementary information associated with the image at the point of time t.

The processor 1 executes a separation distance measurement processing for measuring the separation distance of the living body in the moving period (S105). In processing S105, the processor 1 obtains an index value that corresponds to the separation distance of the living body based on the ratio between the first movement amount and the second movement amount which are obtained in the movement amount measurement processing (S104) with respect to the image at a certain point of time t. For example, the processor 1 may obtain the first movement amount per unit pixel by dividing the first movement amount by the second movement amount, and may consider the first movement amount as an index value (also referred to as a separation distance parameter) that corresponds to the separation distance of the living body. In the processing S105, the processor 1 may include the separation distance parameter in the supplementary information associated with the image at the point of time t. In addition, the separation distance in the disclosure may be referred to as a subject distance and a photographing distance.

Figure 10:
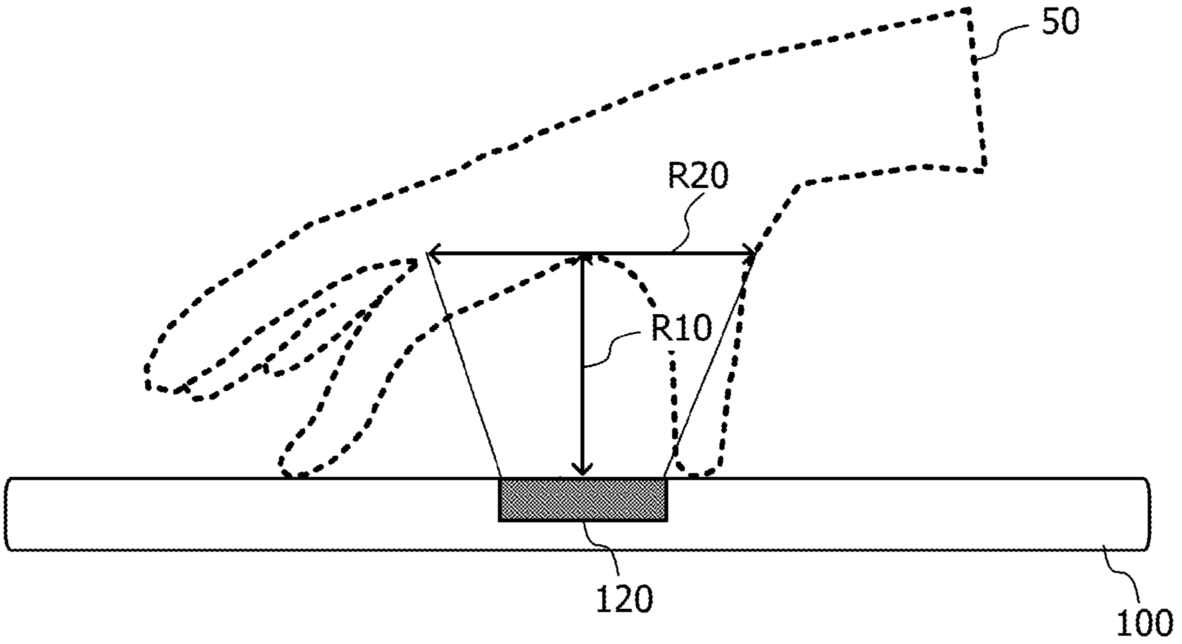
FIG. 10 is a view illustrating an example of a separation distance of the living body.

FIG. 10 is a view illustrating an example of the separation distance of the living body, and illustrates a state where the fingertip of the right hand that serves as the living body 50 is in contact with the information processing apparatus 10 from the side face direction. In the example illustrated in FIG. 10, the palm of the right hand that serves as the living body 50 has a separation distance R10 with the biometric sensor 120 of the information processing apparatus 10. In addition, in the example illustrated in FIG. 10, an example of a capturing range R20 of the biometric sensor 120 at the separation distance R10 is illustrated. In general, as the separation distance R10 becomes greater, the region of the living body included in the capturing range R20 expands. Since the number of pixels of the capturing element of the biometric sensor 120 is fixed, as the capturing range R20 expands, the capturing range per unit pixel of the biometric sensor 120 expands, and the magnification (also referred to as the scale) of the living body included in the capturing range of the biometric sensor 120 deteriorates. Here, the capturing range R20 illustrated in FIG. 10 corresponds to the width of the capturing ranges A1 to A17 in FIG. 7 in the vertical direction (also called the Y-axis direction).

Figure 11:
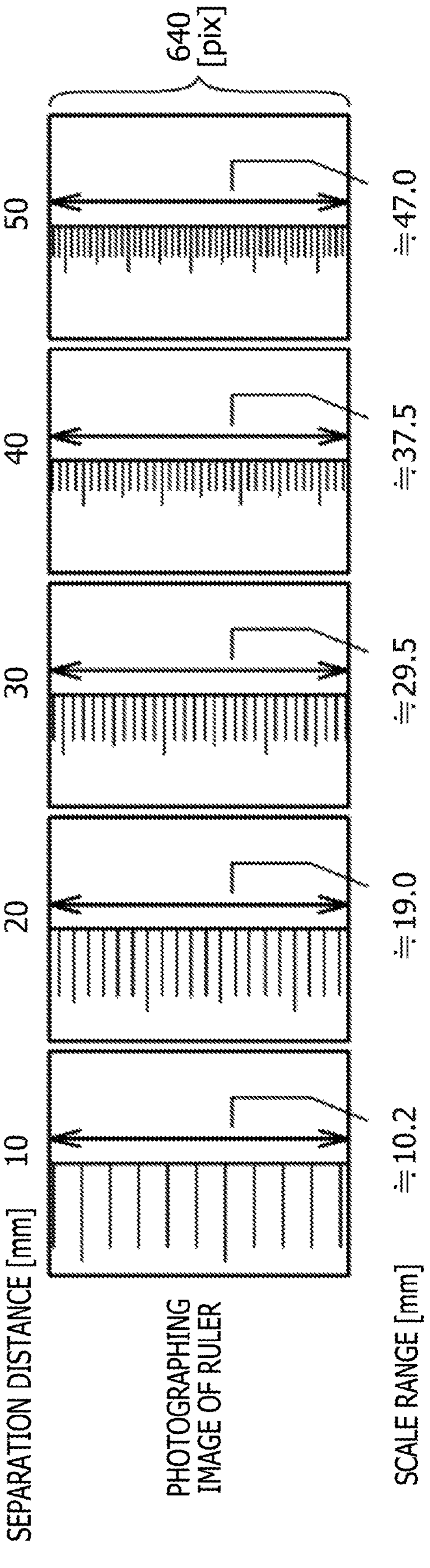
FIG. 11 is a view illustrating an example of a relationship between the separation distance and the capturing range.

FIG. 11 is a view illustrating an example of a relationship between the separation distance and the capturing range. In FIG. 11, for the sake of convenience of explanation, an image obtained by photographing a ruler instead of the palm of the hand is illustrated. As illustrated in FIG. 11, since the capturing range changes in accordance with the separation distance between the ruler and the biometric sensor 120, the capturing range per unit pixel is different. In the example illustrated in FIG. 11, as an example, in a state where the number of pixels in the long side direction of the biometric sensor 120 is 640 pix and the ruler is aligned with the long side direction of a sensor surface of the biometric sensor 120, an image obtained by capturing the separation distance in five stages of 10 mm to 50 mm, is illustrated. In a case of the separation distance is 10 mm, the scale range of the ruler captured in the image is 10.2 mm, and the capturing range per unit pixel is 0.0159375 mm/pix. In addition, in a case where the separation distance is 20 mm, 30 mm, 40 mm, and 50 mm, the scale range of the ruler captured in the image is 19.0 mm, 29.5 mm, 37.5 mm, and 47.0 mm, and the capturing ranges per unit pixel are 0.0296875 mm/pix, 0.04609375 mm/pix, 0.05859375 mm/pix, and 0.0734375 mm/pix. In addition, it is desired to be noted that the numerical values illustrated in FIG. 11 are only examples and may vary in accordance with the characteristics of the optical lens used for the biometric sensor 120.

As illustrated in FIG. 11, the capturing range per pixel unit varies in accordance with the separation distance, and as the separation distance becomes greater, the capturing range per unit pixel becomes greater. In other words, the second movement amount based on the movement amount of the common region included in the image becomes smaller as the separation distance of the living body to the information processing apparatus 10 becomes greater. Therefore, for example, in a case where a value obtained by dividing the first movement amount by the second movement amount is used as the separation distance parameter, as the separation distance of the measured value with respect to the information processing apparatus 10 becomes greater, the second movement amount becomes smaller and the separation distance parameter becomes greater.

The description returns to the description of FIG. 4. In a case where the movement amount (also referred to as a cumulative movement amount) between two different points of time in the moving period exceeds a threshold value based on the separation distance, the processor 1 executes the selection processing for selecting an image (also referred to as a selected image) that corresponds to each of the two points of time (S106) from the images obtained in the capturing processing (S103). The selection processing (S106) has an aspect of selecting a second image group to be used for authentication of the living body from the first image group. For example, the second image group may include a plurality of images selected from the first group of images.

In the processing S106, execution may be started with the contact position of the living body moving from the start point to the end point of the contact guide route as a trigger. In other words, the processor 1 may wait for the execution of the selection processing (S106) until it is detected that the contact position of the living body obtained in the detection processing (S102) has reached the end point on the contact guide route. In this case, the processor 1 may repeatedly execute the processing S101 to the processing S105 until it is detected that the contact position of the living body has reached the end point on the contact guide route.

In the processing S106, for example, the processor 1 may sort the plurality of images obtained in the capturing processing (S103) based on the corresponding supplementary information. For example, the images may be sorted in ascending order based on a time stamp indicated in the supplementary information, or the images may be sorted in ascending order based on the coordinate values on the X-axis of the contact position indicated in the supplementary information. Here, the X-axis is an example of the moving direction along the contact guide route. In addition, in a case where the images obtained in the capturing processing (S103) are stored in the above-described ordered order, the above-described sorting in the selection processing (S106) may be omitted.

Figure 12:
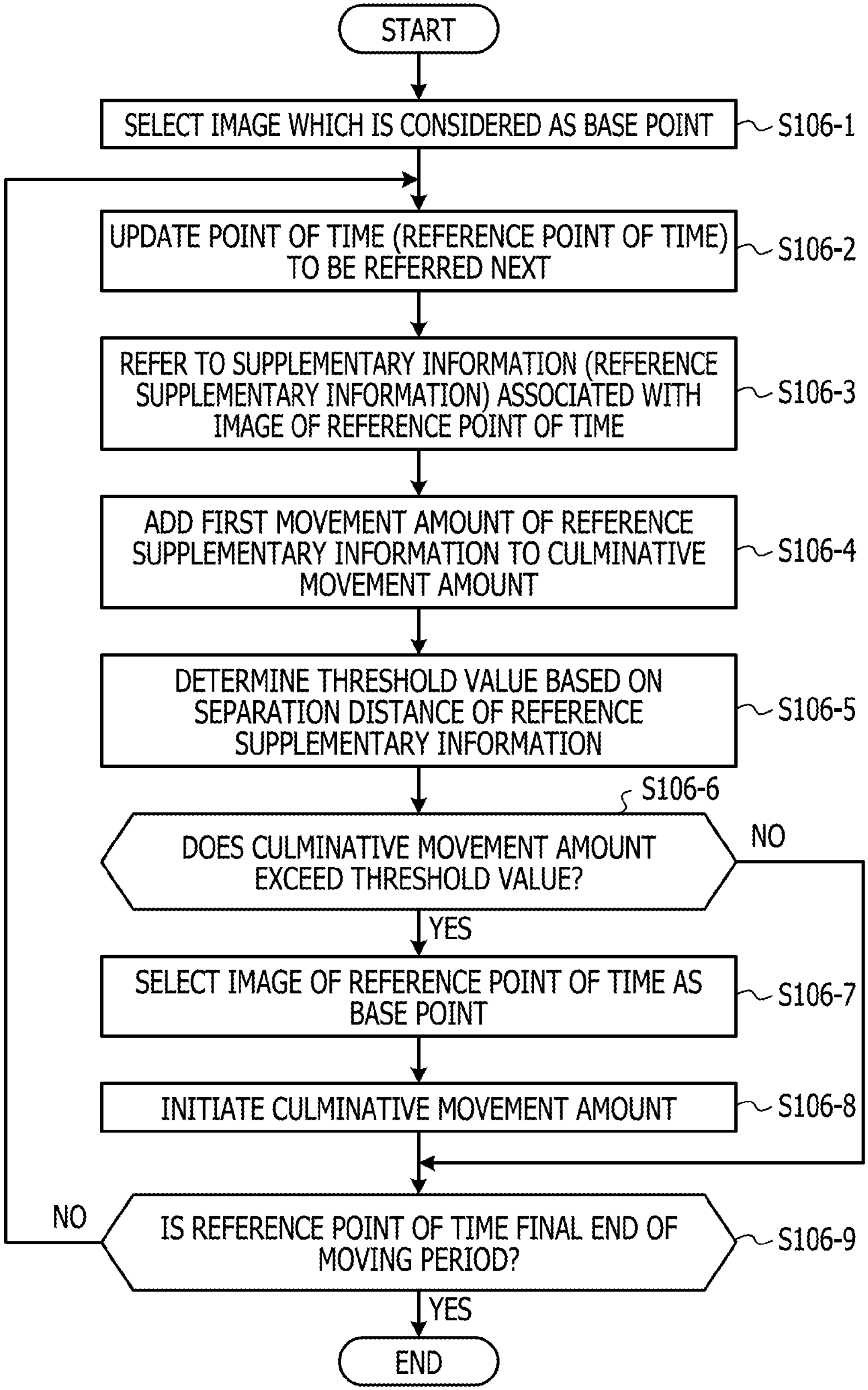
FIG. 12 is a view illustrating an example of a flow of selection processing.

FIG. 12 is a view illustrating an example of a flow of selection processing (S106). In processing S106, the processor 1 selects, for example, a leading image among the images captured in the moving period as a base point (S106-1). In the example illustrated in FIG. 7, the image A1 captured at the point of time T1 is an example of the leading image. Here, it is desired to be noted that the image selected as the base point has an aspect as a selected image from which the biometric features are extracted by extraction processing (S107). For example, the processor 1 may register the information related to the image selected as the base point in the processing S106-1 in the selected image list. In the selected image list, for example, the selected image and the supplementary information associated with the selected image may be registered. Otherwise, an index number indicating the number of the point of time of the image at which the capturing is performed among the plurality of images captured during the moving period may be registered in a selected image list.

The processor 1 updates the next point of time of reference (also referred to as the reference point) (S106-2). In the processing S106-2, for example, the processor 1 may update the reference point of time by adding 1 to the point of time t of the image selected by the processing S106-1. In other words, in the processing S106-1, the processor 1 may update the reference point of time by calculating the reference point of time t=t+1. In the example illustrated in FIG. 7, the point of time T2 is an example of the reference point of time updated by adding 1 to the reference point of time T1 before updating.

The processor 1 refers to the supplementary information (also referred to as reference supplementary information) associated with the image at the reference point of time (S106-3) and adds the first movement amount indicated in the reference supplementary information to the cumulative movement amount (S106-4). Here, the initial value of the cumulative movement amount before the addition is, for example, a zero value.

The processor 1 determines a threshold value based on the separation distance indicated in the reference supplementary information (S106-5). FIG. 13 is a view illustrating an example of a relationship between the separation distance and the threshold value. In the example illustrated in FIG. 13, the correspondence relationship between the separation distance (D1) and the threshold value (D2) is illustrated. In the processing S106-5, for example, in a case where the separation distance R (also referred to as a separation distance parameter R) indicated in the reference supplementary information is equal to or less than a value R1, the processor 1 selects a threshold value Th1. In the processing S106-5, for example, in a case where the separation distance parameter R is greater than the value R1 and equal to or less than the value R2, the processor 1 selects the threshold value Th2. In the processing S106-5, for example, in a case where the separation distance parameter R is greater than the value R2, the processor 1 selects a threshold value Th3.

In the example illustrated in FIG. 13, the magnitude relation between the separation distance R1 and the separation distance R2 is R1<R2, and the magnitude relation between the threshold value Th1, the threshold value Th2, and the threshold value Th3 is Th1<Th2<Th3. In other words, in the processing S106-5, the processor 1 sets the threshold value Th to be greater as the separation distance R becomes greater. In addition, in the example illustrated in FIG. 13 is an example of the relationship between the separation distance and the threshold value, and the disclosure is not limited thereto. For example, by calculating a predetermined numerical formula using the separation distance, the threshold value Th may be determined so that the threshold value Th becomes smaller as the separation distance R becomes greater.

The processor 1 determines whether or not the cumulative movement amount exceeds the threshold value (S106-6). In the processing S106-6, in a case where it is determined that the cumulative movement amount exceeds the threshold value (YES in S106-6), the processor 1 selects the image at the reference point of time as the base point (S106-7) and initializes the cumulative movement amount (S106-8). Here, it is desired to be noted that the image at the reference point of time selected as the base point has an aspect as a selected image from which the biometric features are extracted by extraction processing (S107). For example, the processor 1 may register the information related to the image at the reference point of time selected as the base point in the processing S106-7 in the selected image list. In the selected image list, for example, the selected image and the supplementary information associated with the selected image may be registered. Otherwise, an index number indicating the number of the point of time of the image at which the capturing is performed among the plurality of images captured during the moving period may be registered in a selected image list.

Meanwhile, in S106-6, in a case where it is determined that the cumulative movement amount is equal to or less than the threshold value (NO in S106-6), the processor 1 may omit the execution of the processing S106-7 and processing S106-8.

The processor 1 determines whether or not the current reference point of time corresponds to a final end of the moving period (S106-9). For example, in a case where there is no image captured at a point of time later than the current reference point of time, the processor 1 may determine that the current reference point of time corresponds to the final end of the moving period. For example, in a case where there is an image captured at a point of time later than the current reference point of time, the processor 1 may determine that the current reference point of time does not correspond to the final end of the moving period.

In the processing S106-9, in a case where it is determined that the current reference point of time corresponds to the final end of the moving period (YES in S106-9), the processor 1 may finish the selection processing (S106) illustrated in FIG. 12. In this case, determination about whether or not all of the images captured during the moving period is to be selected, is executed.

Meanwhile, in the processing S106-9, in a case where it is determined that the current reference point of time does not correspond to the final end of the moving period (NO in S106-9), the processor 1 may re-execute the processing after the processing S106-2 again. In this case, in the processing S106-2, for example, 1 is added to the reference point of time to update the reference point of time.

Figure 14:
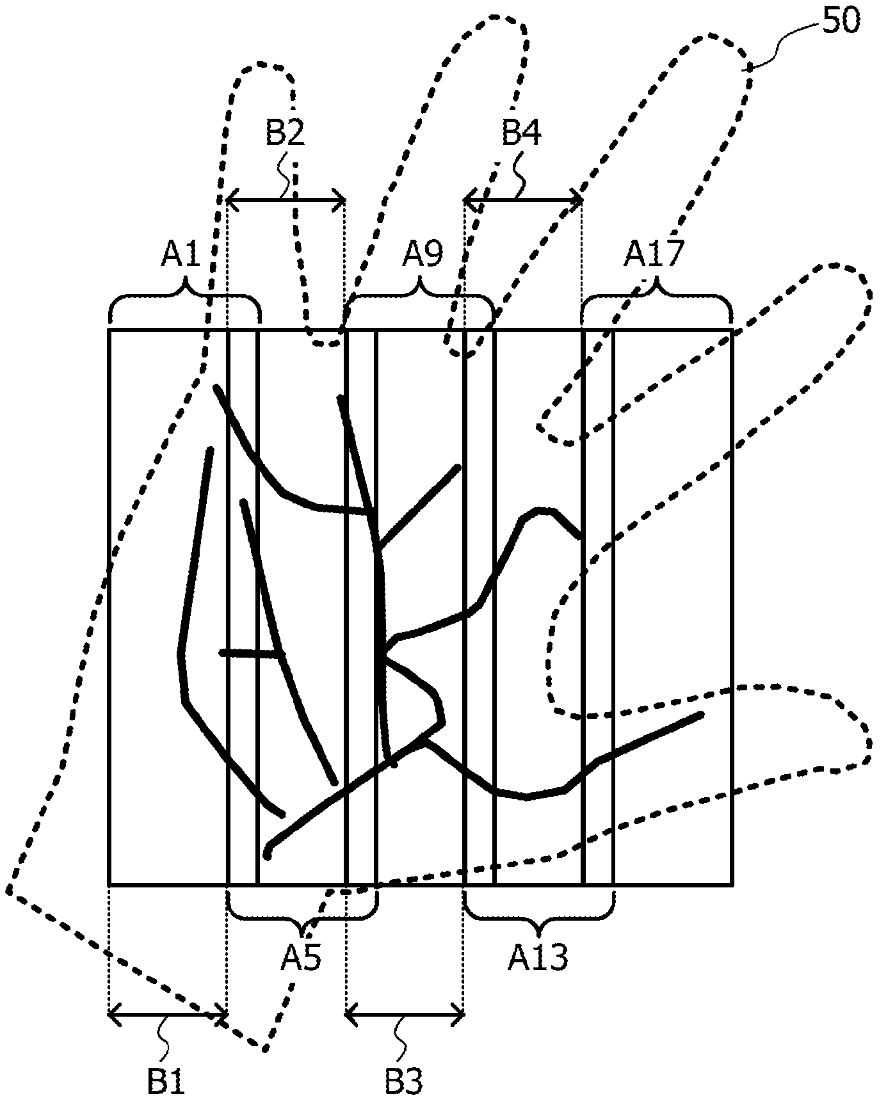
FIG. 14 is a view illustrating an example of a selected image in which a part of a region of the living body is a capturing target.

FIG. 14 is a view illustrating an example of a selected image in which a part of the region of the living body 50 is a capturing target. In the example illustrated in FIG. 14, an example in which a total of five images including the capturing range A1, the capturing range A5, the capturing range A9, the capturing range A13, and the capturing range A17 (also referred to as a selected image) are selected among the capturing ranges A1 to A17 (also referred to as images A1 to A17) illustrated in FIG. 7. Movement amounts B1 to B4 between the selected images correspond to the cumulative movement amount when the movement amounts are considered as a selection target in the determination using the threshold value based on the separation distance at each reference point of time. The movement amounts B1 to B4 (also called cumulative movement amounts B1 to B4) may be substantially the same or different from each other.

The description returns to the description of FIG. 4. The processor 1 executes the extraction processing for extracting the biometric features from the image (also referred to as selected image) selected by the selection processing (S106) (S107). In the processing S107, the processor 1 extracts feature data indicating biometric features of the living body from each of the selected images obtained by capturing a part of the region of the living body by a known method. In a case where the biometric features which are the extraction target are a palm print, examples of the feature data include a palm print pattern composed of large and small wrinkles on the palm surface, frequency information of the palm print, and the like. In a case where the biometric features which are the extraction target are a palm vein, an example of feature data includes a vein pattern on the inside of the palm. In a case where the biometric features which are the extraction target are a palm shape, examples of feature data include the length of each part of the palm, the shape of the outline of the hand, and the like.

Each piece of the feature data extracted in the processing S107 may extract a feature point which is a characteristic point in each of the selected images, and may include a feature amount calculated from the pixels in the vicinity of the extracted feature point and a coordinate value that indicates a position of the feature point. In this case, the processor 1 refers to surrounding pixels having a predetermined number of pixels centered on the position of the extracted feature point, and can obtain the features at the feature point by using known techniques, such as local phase quantization (LPQ), local binary pattern (LBP), scale-invariant feature transform (SIFT)/(speeded up robust features (SURF), oriented FAST and rotated BRIEF (ORB), binary robust independent elementary features (BRIEF), binary robust invariant scalable keypoints (BRISK), D-Nets, KAZE, or the like, or by using a method obtained by combining the techniques to each other.

The processor 1 creates registration data by associating the feature data obtained in the extraction processing (S107) with the corresponding supplementary information for each of the selected images, and executes data registration processing for registering the registration data in the registration data DB 202 (S108). The data registration processing (S108) is an example of the processing by the registration unit 19. In the processing S108, the processor 1 may include attribute information including information for identifying a user who provides the living body (also referred to as a user identification (ID)) and the like, in the registration data. The processor 1 may obtain the attribute information by the input operation of the user before starting a series of processing flows illustrated in FIG. 4, or may obtain the attribute information before executing the data registration processing (S108) illustrated in FIG. 4 by the input operation of the user.

In the example of the selected image illustrated in FIG. 14, the registration data including the feature data extracted from the selected image A1, the registration data including the feature data extracted from the selected image A5, and the registration data including the feature data extracted from the selected image A9, the registration data including the feature data extracted from the selected image A13, and the registration data including the feature data extracted from the selected image A17 are registered in the registration data DB 202. In addition, the registration data related to the selected image A1 includes the supplementary information related to the selected image A1, the registration data related to the selected image A5 includes the supplementary information related to the selected image A5, the registration data related to the selected image A9 includes the supplementary information related to the selected image A9, the registration data related to the selected image A13 includes the supplementary information related to the selected image A13, and the registration data related to the selected image A17 includes the supplementary information related to the selected image A17. The supplementary information included in each piece of the registration data includes a value (also referred to as a separation distance parameter) which indicates the separation distance between the living body 50 and the information processing apparatus 10, for example, as the capturing conditions when capturing each of the selected images A9. Accordingly, when referring to the registration data stored in the registration data DB 202, by referring to the separation distance parameter indicated in the supplementary information included in the registration data, it is possible to ascertain the separation distance at the time of capturing the image from which the feature data of the registration data is extracted.

In addition, a flow of processing in the registration mode illustrated in FIG. 4 is an example, and the disclosure is not limited thereto. For example, the same user may execute a series of processing in the registration mode illustrated in FIG. 4 a plurality of times. Accordingly, it is possible to increase the variations of the capturing conditions of the living body with respect to the registration data stored in the registration data DB 202. At this time, each time the processor 1 executes the series of processing in the registration mode, the processor 1 may group the generated registration data and may store the registration data in the registration data DB 202. In other words, the registration data stored in the registration data DB 202 may be associated with information (also referred to as a group ID) that can identify, for example, the number of times that the data was collected.

Figure 15:
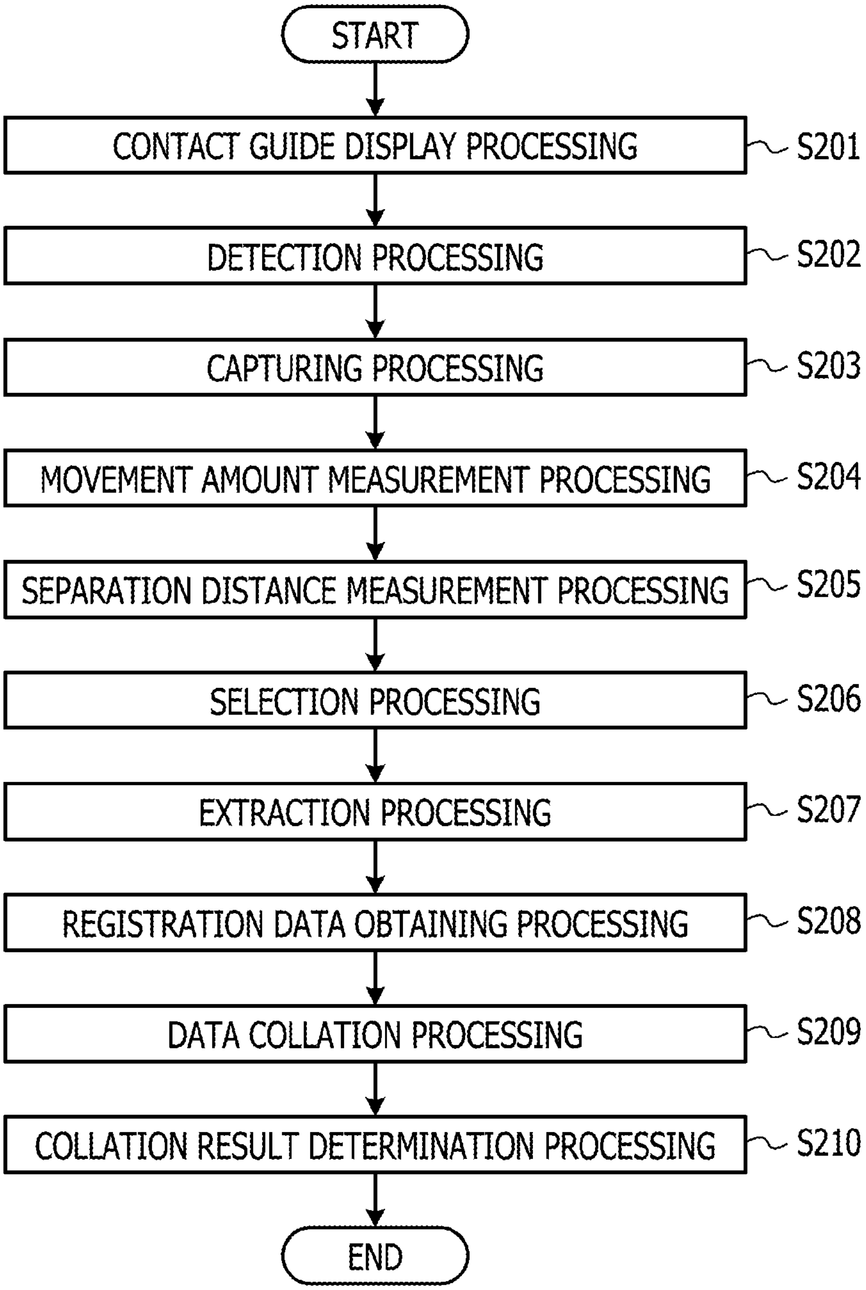
FIG. 15 is a view illustrating an example of a flow of processing in a collation mode.

FIG. 15 is a view illustrating an example of a flow of processing in the collation mode. The flow of the processing in the collation mode illustrated in FIG. 15 may be started while the execution of the biometric authentication program 201 is considered as a trigger, for example, in the collation mode that is a mode of collating the authentication data and the registration data to each other. The instruction operation that the biometric authentication program 201 ought to start execution in the collation mode may receive an instruction from the user by a touch operation on an icon displayed on the touch panel display 110, for example. In addition, the authentication data may include the feature data extracted from the image obtained by the biometric sensor in the collation mode and the supplementary information indicating the capturing conditions when the image is captured.

In the example illustrated in FIG. 15, processing S201 to processing S207 correspond to the processing S101 to the processing S107 illustrated in FIG. 4, respectively. For example, contact guide display processing (S201) illustrated in FIG. 15 is the same as the contact guide display processing (S101) illustrated in FIG. 4. Therefore, description of the processing S201 to the processing S207 in the flow of the processing illustrated in FIG. 15 will be omitted.

By executing the processing S201 to the processing S207, the processor 1 can extract the feature data indicating the biometric features of the living body from the plurality of images of the living body captured by the biometric sensor in the collation mode. In addition, the processor 1 may execute the extraction of the feature data in the collation mode considering all of the plurality of images captured at a plurality of points of time in the moving period of the living body as a target, or considering the selected image selected by the processing S206 as a target.

In the processing S207, the processor 1 may generate the authentication data using, for example, the feature data extracted from the selected image and the supplementary information associated with the selected image. The supplementary information of the authentication data may include the separation distance of the living body when capturing the selected image, and the like. In addition, the supplementary information of the authentication data may include information of the same type as the supplementary information of the registration data stored in the registration data DB 202. For example, the supplementary information of the authentication data may include information related to the contact position obtained in the detection processing (S202), the time stamp which indicates the date and time or the time in accordance with the point of time when the capturing is performed by the biometric sensor 120, the first movement amount and the second movement amount which are obtained in the movement amount measurement processing (S204).

The processor 1 executes registration data obtaining processing for obtaining the registration data to be collated with the authentication data from the registration data DB 202 (S208). The registration data obtaining processing (S208) is an example of the processing by the collation unit 18. In the processing S208, the processor 1 may specify the related registration data based on the attribute information of the user. For example, the processor 1 may use the registration data including the attribute information that matches the attribute information of the user in the collation mode as the related registration data. The attribute information of the user at the time of the collation mode may be obtained by the input operation of the user before starting the flow of the series of the processing illustrated in FIG. 15, or may be obtained by the input operation of the user before executing the registration data obtaining processing (S208) illustrated in FIG. 15.

In the processing S208, in a case where a plurality of groups are registered for one piece of attribute information, the processor 1 may specify the related group based on the supplementary information of the authentication data and may obtain the registration data of the related group from the registration data DB 202. For example, the processor 1 may set the group of the registration data including the supplementary information in which the separation distance parameter that is approximate to the separation distance indicated in the supplementary information of the authentication data, as the related group. Here, each of the groups includes one or more pieces of registration data specified by the group ID and the attribute information set in the registration data stored in the registration data DB 202.

In determining whether or not the separation distance of the registration data that is approximate to the separation distance of the authentication data, the processor 1 may obtain, for example, a representative value of the separation distance in the group by using the separation distance indicated in the supplementary information of the registration data included in the group, for each group. For example, the processor 1 may use a value (also referred to as an average separation distance) obtained by averaging the separation distances indicated in the supplementary information of registration data for each group, as a representative value. Otherwise, for each group, other statistical values, such as the median of the separation distance indicated in the supplementary information of the registration data may be used. The processor 1 may set the group in which the difference between the separation distance indicated in the supplementary information of the authentication data and the representative value is less than a predetermined value, as the related group. Otherwise, the processor 1 may set the group in which the difference between the separation distance indicated in the supplementary information of the authentication data and the representative value becomes the minimum value, as the related group.

The processor 1 executes data collation processing for calculating similarity to be used for the determination of authentication by collating the authentication data obtained in the extraction processing (S207) and the registration data obtained in the registration data obtaining processing (S208) (S209). The data collation processing (S209) is an example of the processing by the collation unit 18. A known collation method may be used in collation between the authentication data and the registration data. Here, the registration data has an aspect as a biometric feature extracted from the selected image selected by the selection processing (S106) in the registration mode. In addition, the authentication data has an aspect as a biometric feature extracted from the selected image selected by the selection processing (S206) in the collation mode.

In the processing S209, the processor 1 may select the registration data including the supplementary information in which a contact position that is approximate to the contact position indicated in the related supplementary information as a collation target, with respect to each of the plurality of images (also referred to as selected images) obtained in the processing S201 to the processing S207. Accordingly, the capturing conditions when capturing the image are approximated by the authentication data and the registration data. In other words, in the image of the authentication data and the image of the registration data, the contact position detected at the time of capturing is approximated, and the separation distance from the living body is approximated. The approximation of the contact position detected at the time of photographing between both images has an aspect in which the relative positional relationship between the contact position of the living body and the biometric sensor in the horizontal direction is approximated. In addition, approximation of the separation distance from the living body between both images has an aspect in which magnifications of the living body included in the capturing range of the image become substantially the same as each other. Therefore, the contact position detected at the time of capturing between the two images is approximated, and the separation distance from the living body is approximated, and thus, the regions of the living body included in the capturing range of the image can be substantially the same as each other.

In the processing S209, the processor 1 may calculate the similarity between the authentication data for each selected image and the registration data, and may, for example, use the average value of all the similarities obtained by the calculation as the similarity to be used for the determination of authentication. The similarity in the disclosure is not limited thereto. For example, in the processing S209, a value obtained by averaging a predetermined number of higher similarities among all similarities calculated by collating the authentication data for each of the selected images and the registration data to each other may be used as a similarity used for the determination of authentication. Otherwise, the maximum similarity may be used as the similarity used for the determination of authentication. Otherwise, a value obtained by averaging similarities equal to or higher than a predetermined value may be used as a similarity used for determination of authentication. It is desired to be noted that the values are merely examples of similarity used for the determination of authentication.

The processor 1 executes collation result determination processing for determining whether or not the similarity obtained in the data collation processing (S209) is equal to or greater than a predetermined threshold value (S210). The collation result determination processing (S210) is an example of the processing by the collation unit 18. In the processing S210, the processor 1 may determine that the authentication is successful in a case where the similarity is equal to or greater than the predetermined threshold value. Meanwhile, in the processing S210, the processor 1 may determine that the authentication is not successful in a case where the similarity is less than the predetermined threshold value.

Figure 16:
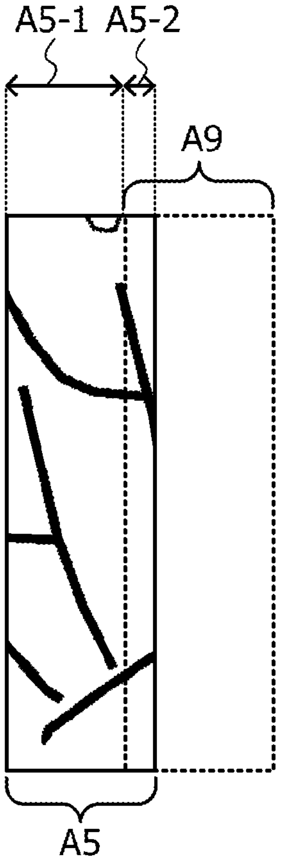
FIG. 16 is a view illustrating an example of the selected image.

The description above is an example of a flow of processing in the collation mode. Next, the relationship between the selection processing (S106 and S206) in the registration mode and collation mode and the data collation processing (S209) in the collation mode will be described. FIG. 16 is a view illustrating an example of the selected image. The selected image A5 illustrated in FIG. 16 corresponds to the selected image A5 illustrated in FIG. 14. The selected image A5 has a non-common region A5-1 and a common region A5-2 in relation to the selected image A9 on the right side. The ratio of the non-common region A5-1 to the common region A5-2 depends on the threshold value that corresponds to the separation distance. The threshold value which corresponds to the separation distance is an example of the selection standard that corresponds to the separation distance. For example, the threshold value is set to become smaller as the separation distance becomes greater, and the non-common region A5-1 becomes smaller and the common region A5-2 becomes greater as the threshold value is set to become smaller. From another point of view, as the separation distance becomes greater, the common region A5-2 becomes greater, and as a result, as the separation distance becomes greater, the number of images selected by one input operation can become greater. However, in a case where the number of images which satisfy the selection standard that corresponds to the separation distance exceeds the upper limit value, the image may be selected within a range that does not exceed the upper limit value. In addition, as illustrated in FIG. 14 (not illustrated in FIG. 16), the selected image A5 also has a non-common region and a common region in relation to the selected image A1 on the left side. In the following description, attention is focused on the selected image A5 and the selected image A9 on the right side.

Figure 17:
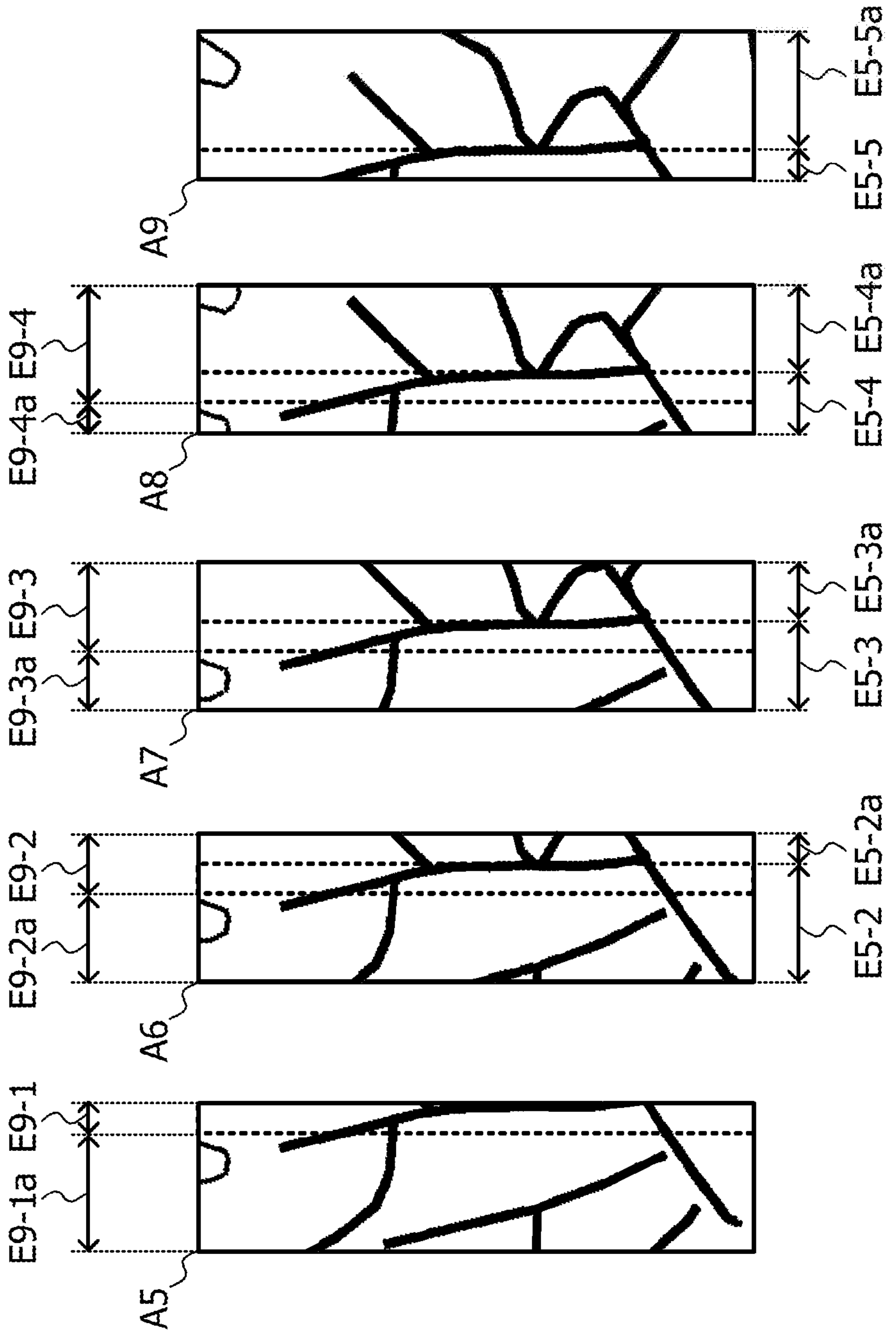
FIG. 17 is a view illustrating an example of a relationship between a contact position at the time of capturing and a common region between the images.

FIG. 17 is a view illustrating an example of a relationship between the contact position at the time of capturing and the common region between the images. The images A5, A6, A7, A8, and A9 in FIG. 17 correspond to the images captured at the points of time T5, T6, T7, T8, and T9 in FIG. 7, respectively. In other words, the images A5 to A9 respectively have an aspect as an image that corresponds to the contact position at the points of time T5 to T9 in FIG. 7. As the contact position at each point of time moves along the contact guide route, the region of the living body captured in the image is different.

In FIG. 17, the images A5 and A9 are examples of selected images. The image A5 has a common region E9-1 and a non-common region E9-1*a* with the image A9. When considering the image A9 as a base point, the image A5 has an aspect as an image shifted to the left only by an amount that corresponds to the non-common region E9-1*a*. In other words, the image A5 has an aspect as an image that corresponds to the contact position shifted to the left by the movement amount that corresponds to the non-common region E9-1*a* from the contact position at the time of capturing of the image A9.

The image A6 illustrated in FIG. 17 has a common region E5-2 and a non-common region E5-2*a* with the image A5 and has a common region E9-2 and a non-common region E9-2*a* with the image A9. When considering the image A5 as a base point, the image A6 has an aspect as an image of which the capturing range is shifted to the right only by an amount that corresponds to the non-common region E5-2*a*. In other words, the image A6 has an aspect as an image that corresponds to the contact position shifted to the right by the movement amount that corresponds to the non-common region E5-2*a* from the contact position at the time of capturing of the image A5. In addition, when considering the image A9 as a base point, the image A6 has an aspect as an image of which the capturing range is shifted to the left only by an amount that corresponds to the non-common region E9-2*a*. In other words, the image A6 has an aspect as an image that corresponds to the contact position shifted to the left by the movement amount that corresponds to the non-common region E9-2*a* from the contact position at the time of capturing of the image A9.

The image A7 illustrated in FIG. 17 has a common region E5-3 and a non-common region E5-3*a* with the image A5 and has a common region E9-3 and a non-common region E9-3*a* with the image A9. When considering the image A5 as a base point, the image A7 has an aspect as an image of which the capturing range is shifted to the right only by an amount that corresponds to the non-common region E5-3*a*. In other words, the image A7 has an aspect as an image that corresponds to the contact position shifted to the right by the movement amount that corresponds to the non-common region E5-3*a* from the contact position at the time of capturing of the image A5. In addition, when considering the image A9 as a base point, the image A7 has an aspect as an image of which the capturing range is shifted to the left only by an amount that corresponds to the non-common region E9-3*a*. In other words, the image A7 has an aspect as an image that corresponds to the contact position shifted to the left by the movement amount that corresponds to the non-common region E9-3*a* from the contact position at the time of capturing of the image A9.

The image A8 illustrated in FIG. 17 has a common region E5-4 and a non-common region E5-4*a* with the image A5 and has a common region E9-4 and a non-common region E9-4*a* with the image A9. When considering the image A5 as a base point, the image A8 has an aspect as an image of which the capturing range is shifted to the right only by an amount that corresponds to the non-common region E5-4*a*. In other words, the image A8 has an aspect as an image that corresponds to the contact position shifted to the right by the movement amount that corresponds to the non-common region E5-4*a* from the contact position at the time of capturing of the image A5. In addition, when considering the image A9 as a base point, the image A8 has an aspect as an image of which the capturing range is shifted to the left only by an amount that corresponds to the non-common region E9-4*a*. In other words, the image A8 has an aspect as an image that corresponds to the contact position shifted to the left by the movement amount that corresponds to the non-common region E9-4*a* from the contact position at the time of capturing of the image A9.

The image A9 illustrated in FIG. 17 has a common region E5-5 and a non-common region E5-5*a* with the image A5. When considering the image A5 as a base point, the image A9 has an aspect as an image of which the capturing range is shifted to the right only by an amount that corresponds to the non-common region E5-5*a*. In other words, the image A9 has an aspect as an image that corresponds to the contact position shifted to the right by the movement amount that corresponds to the non-common region E5-5*a* from the contact position at the time of capturing of the image A5.

In the example illustrated in FIG. 17, as the capturing range is displaced from the image A5 to the image A9, the common region with the image A5 becomes smaller and the common region with the image A9 becomes greater. In other words, as the capturing range is displaced from the image A5 to the image A9, the non-common region with the image A5 becomes greater and the non-common region with the image A9 becomes smaller. Therefore, as the capturing range is displaced from the image A5 to the image A9, the similarity with the image A5 becomes smaller and the similarity with the image A9 becomes greater. For example, in the image A6, since the common region E5-2 with the image A5 is greater than the common region E9-2 with the image A9, the similarity with the image A5 is generally greater than the similarity with the image A9. Meanwhile, in the image A8, since the common region E9-4 with the image A9 is greater than the common region E5-4 with the image A5, the similarity with the image A9 is generally greater than the similarity with the image A5.

Here, even in a case where the same living body is captured in the registration mode and the collation mode, the captured images can be different from each other since the moving speed of the living body and the like are different. Therefore, the region of the living body included in the capturing range can be different between the selected image by the selection processing (S106) in the registration mode and the selected image by the selection processing (S206) in the collation mode. For example, there are cases where the image A5 is selected as one of the selected images in the registration mode and the image A6 is selected as one of the selected images in the collation mode. In this case, the selected image A5 in the registration mode and the selected image A6 in the collation mode are collation targets. In other words, the feature data extracted from the selected image A5 has aspects as the registration data, and the feature data extracted from the selected image A6 has aspects as the authentication data.

In the example illustrated in FIG. 17, the image A6 has a common region E5-2 and a non-common region E5-2*a* with the image A5. In a case where the image A5 and the image A6 are collation targets, the non-common region E5-2*a* can act as an element for decreasing the similarity calculated by the data collation processing (S209). The degree of decrease in similarity depends on the ratio of the common region and the non-common region. In other words, in a case where the image A5 and the image A6 are collation targets, the non-common region E5-2*a* with the image A5 in the image A6 is smaller than the non-common regions E5-3*a* to E5-5*a* with the image A5 in the images A7 to A9, the common region E5-2 with the image A5 in the image A6 is greater than the common region E5-3 to E5-5 with the image A5 in the images A7 to A9, and thus, the degree of decrease in similarity can generally be small. Therefore, in a case where the selected image by the selection processing (S106) in the registration mode includes the image A5 and the image A9 and the selected image by the selection processing (S206) in the collation mode includes the image A6, in the data collation processing (S209), the similarity between the images when the image A6 and the image A5 are collation targets can be generally higher than that of a case where the image A6 and the image A9 are collation targets. Therefore, in the registration data obtaining processing (S208), the processor 1 can select the registration data related to the image A5 as the collation target with the authentication data on the image A6. Accordingly, it is expected that the influence caused by fluctuation of the capturing conditions is suppressed, and true acceptance rate is suppressed. Such an effect is useful for suppressing the influence on the authentication accuracy by fluctuation of capturing conditions.

Meanwhile, in a case where the selected image by the selection processing (S106) in the registration mode includes the image A5 and the image A9 and the selected image by the selection processing (S206) in the collation mode includes the image A8, in the data collation processing (S209), the similarity between the images when the image A8 and the image A9 are collation targets can be generally higher than that of a case where the image A8 and the image A5 are collation targets. This is because, in the image A8, the common region E9-4 with the image A9 is greater than the common region E5-4 with the image A5. Therefore, in the registration data obtaining processing (S208), the processor 1 can select the registration data related to the image A9 as the collation target with the authentication data on the image A8. Accordingly, it is expected that the influence caused by fluctuation of the capturing conditions is suppressed, and true acceptance rate is suppressed. Such an effect is useful for suppressing the influence on the authentication accuracy by fluctuation of capturing conditions.

In addition, in the image A7, the size of the common region E5-3 with the image A5 and the size of the common region E9-3 with the image A9 are substantially the same as each other. In other words, in the image A7, the size of the non-common region E5-3*a* with the image A5 and the size of the non-common region E9-3*a* with the image A9 are substantially the same as each other. Therefore, in a case where the selected image by the selection processing (S106) in the registration mode includes the image A5 and the image A9, and the selected image by the selection processing (S206) in the collation mode includes the image A7, in the registration data obtaining processing (S208), the processor 1 may select the registration data related to the image A5 and the registration data related to the image A9 as the collation target with the authentication data related to the image A7. Accordingly, it is expected that the influence caused by fluctuation of the capturing conditions is suppressed, and true acceptance rate is suppressed. Such an effect is useful for suppressing the influence on the authentication accuracy by fluctuation of capturing conditions.

Figure 18:
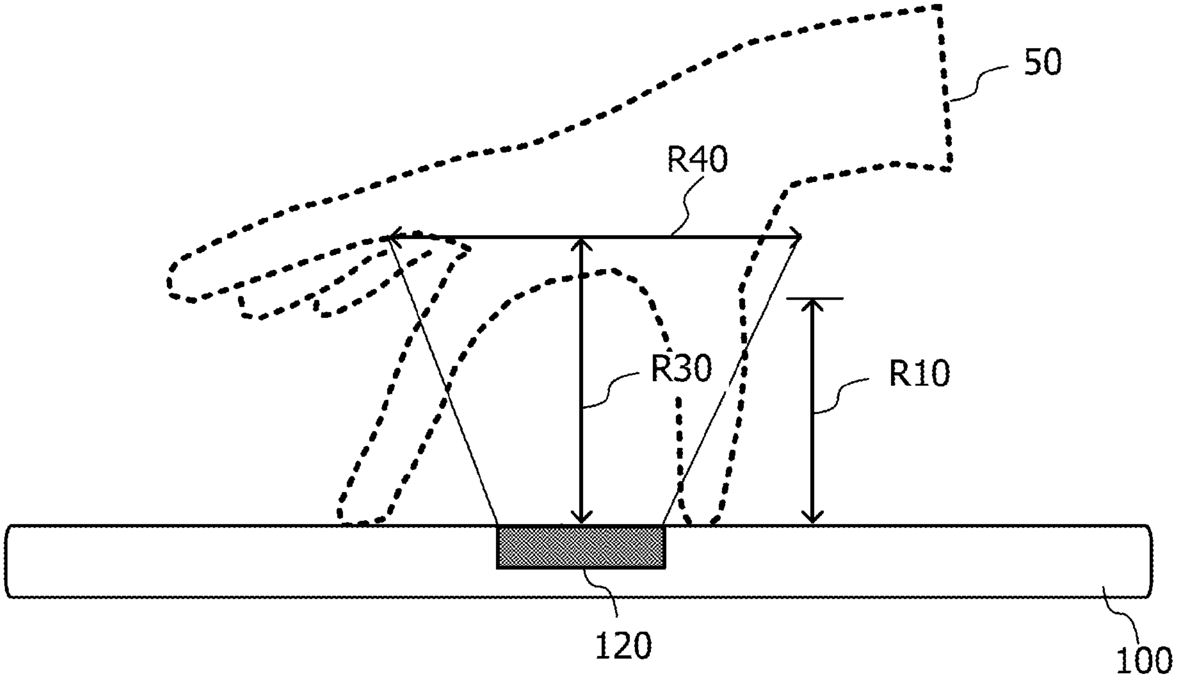
FIG. 18 is a view (second) illustrating an example of the separation distance of the living body.

Next, a case where the separation distance is large will be described. FIG. 18 is a view (second) illustrating an example of the separation distance of the living body, and illustrates a state where the fingertip of the right hand that serves as the living body 50 is in contact with the information processing apparatus 10 from the side face direction. In the example illustrated in FIG. 18, the palm of the right hand that serves as the living body 50 has a separation distance R30 with the biometric sensor 120 of the information processing apparatus 10. In addition, in the example illustrated in FIG. 18, an example of a capturing range R40 of the biometric sensor 120 at the separation distance R30 is illustrated. Here, the separation distance R30 in FIG. 18 is greater than the separation distance R10 in FIG. 10. Therefore, in the example illustrated in FIG. 18, the region of the living body included in the capturing range R40 is greater than the region of the living body included in the capturing range R20 illustrated in FIG. 10. In other words, in the example illustrated in FIG. 18, the magnification (also referred to as the scale) of the living body included in the capturing range of the biometric sensor 120 becomes smaller compared to the example illustrated in FIG. 10.

Figure 19:
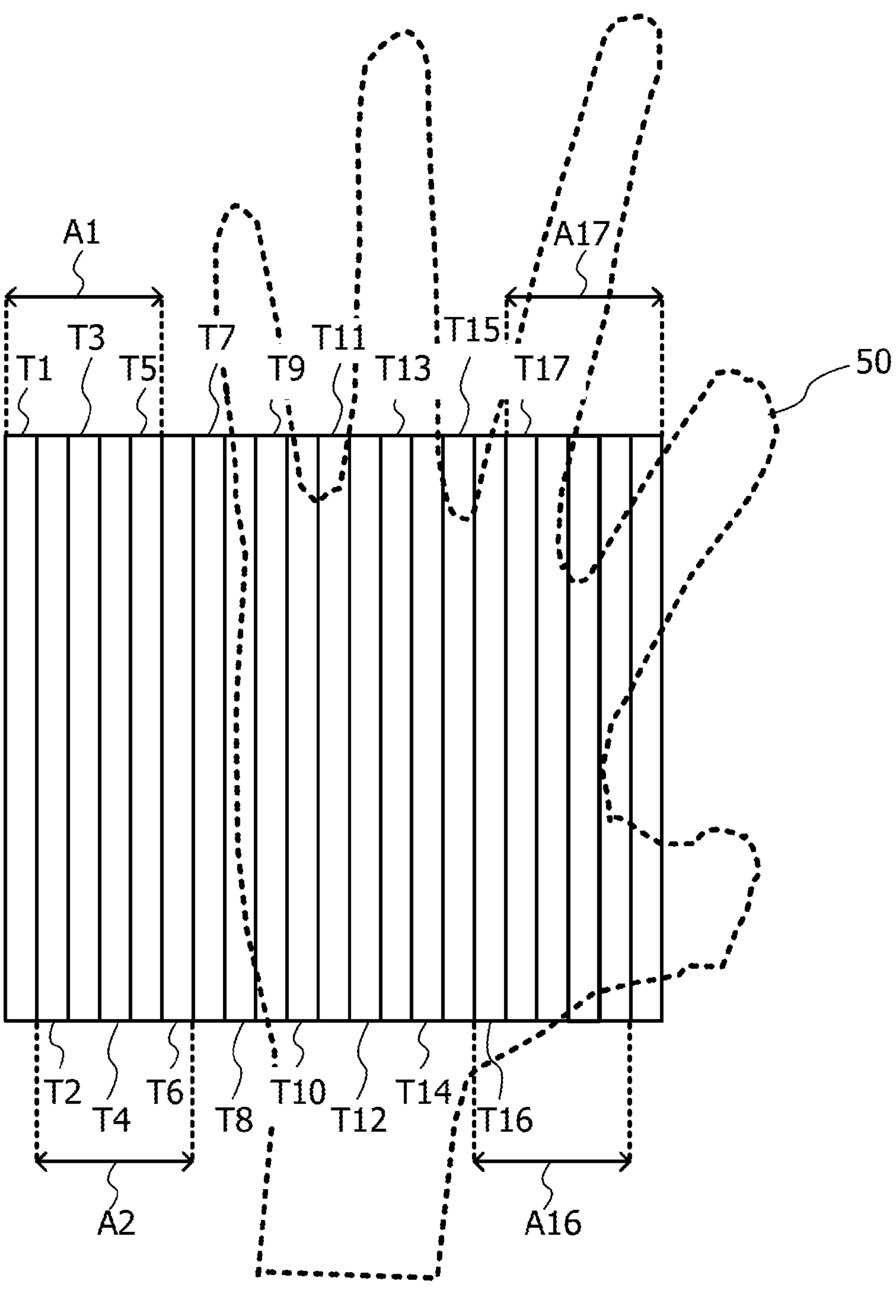
FIG. 19 is a view (second) illustrating an example of the capturing range of the living body.

FIG. 19 is a view (second) illustrating an example of the capturing range of the living body, and is illustrated in a state where the palm side of the right hand that serves as the living body faces the front. In other words, the thumb of the right hand is illustrated facing the right side. In the example of FIG. 19, images of the capturing ranges A1 to A17 are captured at a plurality of points of time T1 to T17 in the moving period during which the contact position of the living body 50 moves along the contact guide route. In addition, in the disclosure, it is desired to be noted that the number of times of capturing in the moving period is not limited to 17 times indicated by the points of time T1 to T17, and FIG. 19 is an example.

In the example illustrated in FIG. 19, the width of the capturing ranges A1 to A17 in the vertical direction (also called the Y-axis direction) corresponds to the capturing range R40 of the living body captured by the biometric sensor 120 at the separation distance R30 illustrated in FIG. 18. Compared to the example with the example illustrated in FIG. 7, in the example illustrated in FIG. 19, the magnification of the living body included in the capturing range becomes smaller. This is because the separation distance R30 is greater than the separation distance R10. In addition, in the example of FIG. 19, illustration of the capturing ranges A3 to A15 is also omitted for the convenience of explanation.

Figure 20:
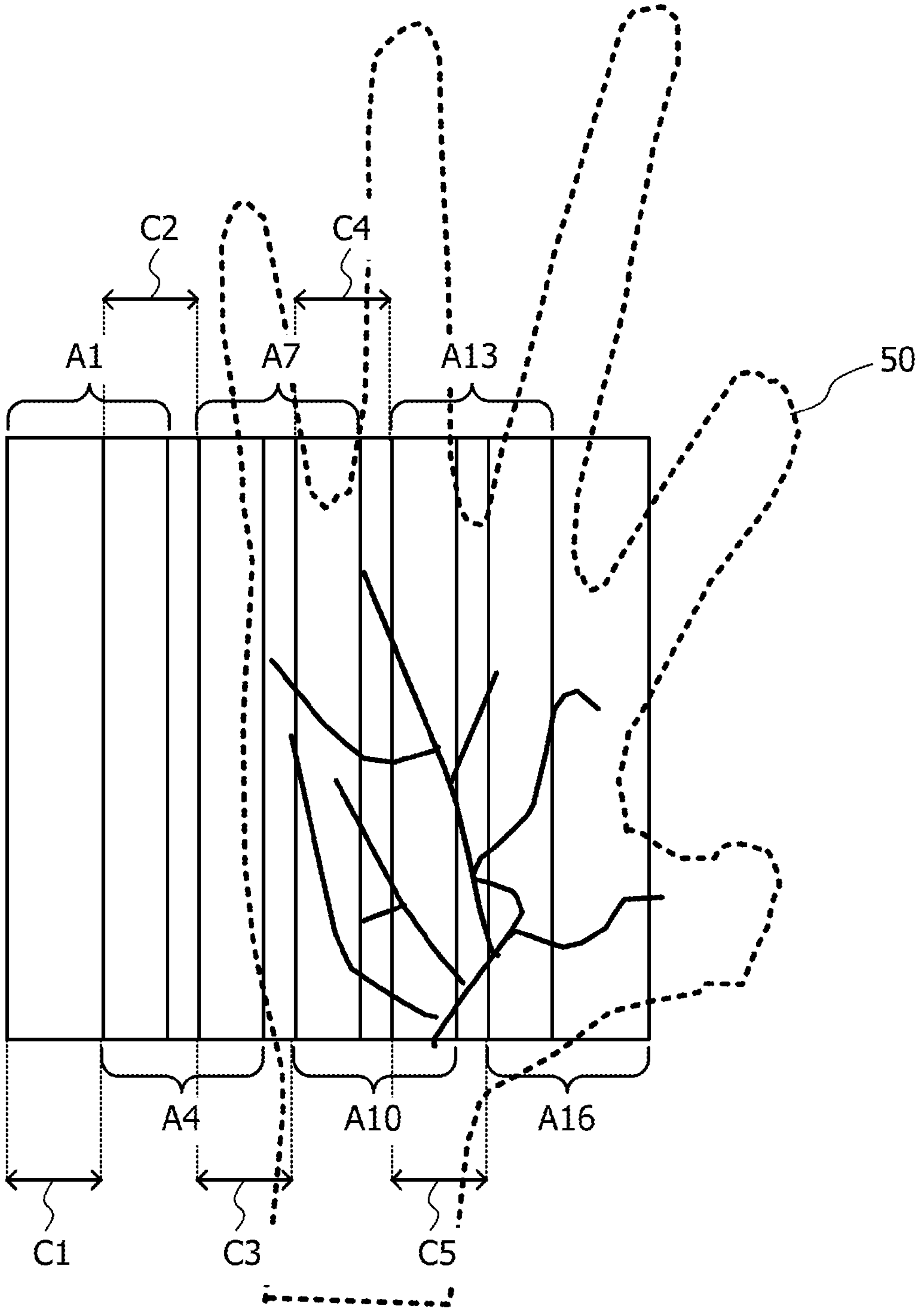
FIG. 20 is a view (second) illustrating an example of the selected image in which a part of the region of the living body is the capturing target.

FIG. 20 is a view (second) illustrating an example of the selected image in which a part of the region of the living body is the capturing target. In the example illustrated in FIG. 20, an example in which a total of six images including the capturing range A1, the capturing range A4, the capturing range A7, the capturing range A10, the capturing range A13, and the capturing range A16 (also referred to as a selected image) are selected among the capturing ranges A1 to A17 (also referred to as images A1 to A17) illustrated in FIG. 19. Movement amounts C1 to C5 between each of the selected images correspond to the cumulative movement amount between adjacent selected images. The cumulative movement amounts C1 to C5 depend on the threshold value based on the separation distance. The movement amounts C1 to C5 may be substantially the same or different from each other. In the example illustrated in FIG. 20, compared to the cumulative movement amounts B1 to B4 illustrated in FIG. 14, the cumulative movement amounts C1 to C5 becomes smaller. This is because, since the separation distance R30 is greater than the separation distance R10, the threshold value based on the separation distance R30 is set to be smaller than the threshold value based on the separation distance R10.

Figure 21:
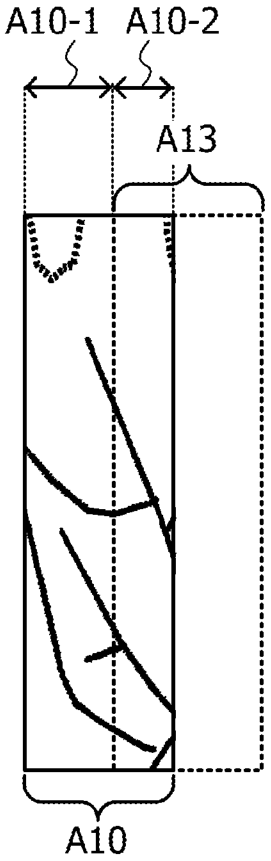
FIG. 21 is a view (second) illustrating an example of the selected image.

FIG. 21 is a view (second) illustrating an example of the selected image. The selected image A10 illustrated in FIG. 21 corresponds to the selected image A10 illustrated in FIG. 20. The selected image A10 has a non-common region A10-1 and a common region A10-2 in relation to the selected image A13 on the right side. The ratio of the non-common region A10-1 to the common region A10-2 depends on the threshold value that corresponds to the separation distance. The threshold value which corresponds to the separation distance is an example of the selection standard that corresponds to the separation distance. Compared to the example illustrated in FIG. 16, in the example illustrated in FIG. 21, the boundary between the non-common region A10-1 and the common region A10-2 in the selected image A10 is shifted to the left. This is because, since the threshold value based on the separation distance R30 is set to be smaller than the threshold value based on the separation distance R10, the cumulative movement amount considering the image A10 as a base point when the image A13 is selected becomes smaller. In this manner, the threshold value is set to become smaller as the separation distance becomes greater, and the non-common region A10-1 becomes smaller and the common region A10-2 becomes greater as the threshold value is set to become smaller. From another point of view, as the separation distance becomes greater, the common region A10-2 becomes greater, and as a result, as the separation distance becomes greater, the number of images selected by one input operation can become greater. However, in a case where the number of images which satisfy the selection standard that corresponds to the separation distance exceeds the upper limit value, the image may be selected within a range that does not exceed the upper limit value. In addition, as illustrated in FIG. 20 (not illustrated in FIG. 21), the selected image A10 also has a non-common region and a common region in relation to the selected image A7 on the left side. In the following description, attention is focused on the selected image A10 and the selected image A13 on the right side.

Figure 22:
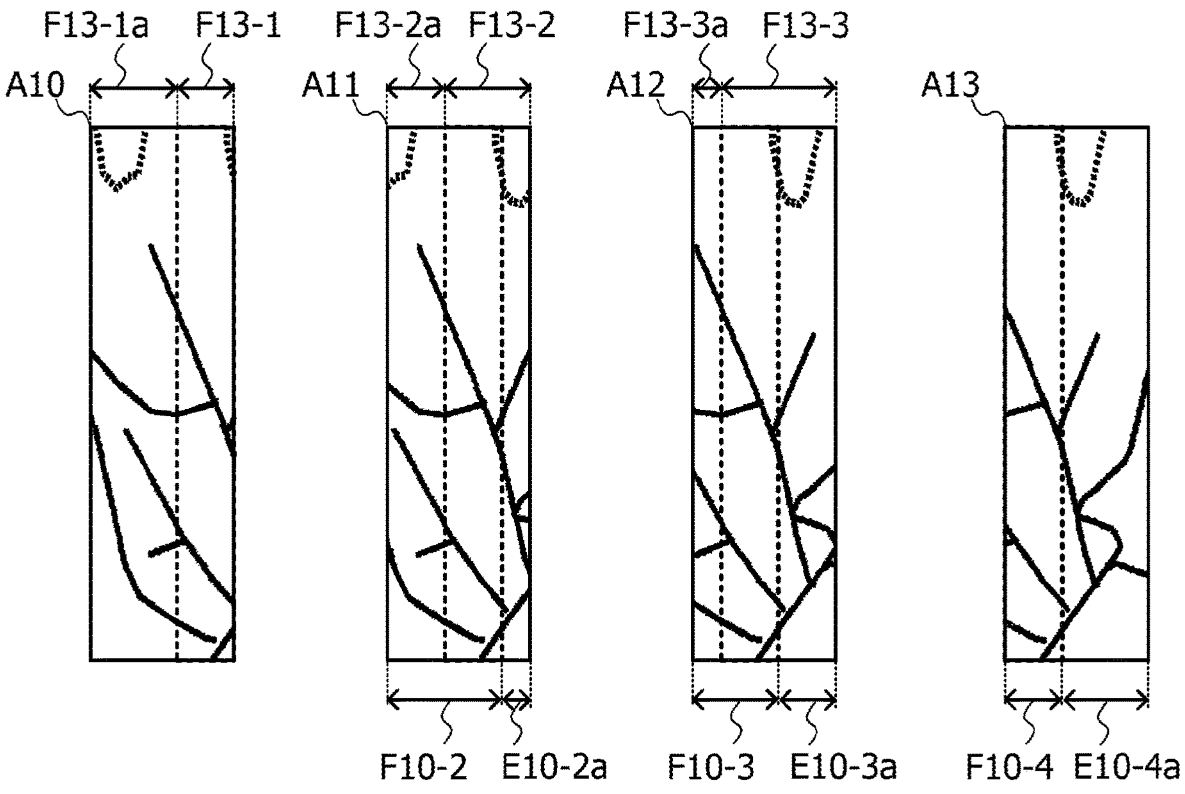
FIG. 22 is a view (second) illustrating an example of the relationship between the contact position at the time of capturing and the common region between the images.

FIG. 22 is a view (second) illustrating an example of the relationship between the contact position at the time of capturing and the common region between the images. The images A10, A11, A12, and A13 in FIG. 22 correspond to the images captured at the points of time T10, T11, T12, and T13 in FIG. 19, respectively. In other words, the images A10 to A13 respectively have an aspect as an image that corresponds to the contact position at the points of time T10 to T13 in FIG. 19. As the contact position at each point of time moves along the contact guide route, the region of the living body captured in the image is different.

In FIG. 22, the images A10 and A13 are examples of selected images. The image A10 has a common region F13-1 and a non-common region F13-1*a* with the image A13. When considering the image A13 as a base point, the image A10 has an aspect as an image shifted to the left only by an amount that corresponds to the non-common region F13-1*a*. In other words, the image A10 has an aspect as an image that corresponds to the contact position shifted to the left by the movement amount that corresponds to the non-common region F13-1*a* from the contact position at the time of capturing of the image A13.

The image A11 illustrated in FIG. 22 has a common region F10-2 and a non-common region F10-2*a* with the image A10 and has a common region F13-2*a* and a non-common region F13-2 with the image A13. When considering the image A10 as a base point, the image A11 has an aspect as an image of which the capturing range is shifted to the right only by an amount that corresponds to the non-common region F10-2*a*. In other words, the image A11 has an aspect as an image that corresponds to the contact position shifted to the right by the movement amount that corresponds to the non-common region F10-2*a* from the contact position at the time of capturing of the image A10. In addition, when considering the image A13 as a base point, the image A11 has an aspect as an image of which the capturing range is shifted to the left only by an amount that corresponds to the non-common region F13-2*a*. In other words, the image A11 has an aspect as an image that corresponds to the contact position shifted to the left by the movement amount that corresponds to the non-common region F13-2*a* from the contact position at the time of capturing of the image A13.

The image A12 illustrated in FIG. 22 has a common region F10-3 and a non-common region F10-3*a* with the image A10 and has a common region F13-3*a* and a non-common region F13-3 with the image A13. When considering the image A10 as a base point, the image A12 has an aspect as an image of which the capturing range is shifted to the right only by an amount that corresponds to the non-common region F10-3*a*. In other words, the image A11 has an aspect as an image that corresponds to the contact position shifted to the right by the movement amount that corresponds to the non-common region F10-3*a* from the contact position at the time of capturing of the image A10. In addition, when considering the image A13 as a base point, the image A12 has an aspect as an image of which the capturing range is shifted to the left only by an amount that corresponds to the non-common region F13-3*a*. In other words, the image A12 has an aspect as an image that corresponds to the contact position shifted to the left by the movement amount that corresponds to the non-common region F13-3*a* from the contact position at the time of capturing of the image A13.

The image A13 illustrated in FIG. 22 has a common region F10-4 and a non-common region F10-4*a* with the image A10. When considering the image A10 as a base point, the image A13 has an aspect as an image of which the capturing range is shifted to the right only by an amount that corresponds to the non-common region F10-4*a*. In other words, the image A13 has an aspect as an image that corresponds to the contact position shifted to the right by the movement amount that corresponds to the non-common region F10-4*a* from the contact position at the time of capturing of the image A10.

In the example illustrated in FIG. 22, as the capturing range is displaced from the image A10 to the image A13, the common region with the image A10 becomes smaller and the common region with the image A13 becomes greater. In other words, as the capturing range is displaced from the image A10 to the image A13, the non-common region with the image A10 becomes greater and the non-common region with the image A13 becomes smaller. Therefore, as the capturing range is displaced from the image A10 to the image A13, the similarity with the image A10 becomes smaller and the similarity with the image A13 becomes greater. For example, in the image A11, since the common region F10-2 with the image A10 is greater than the common region F13-1 with the image A13, the similarity with the image A10 is generally greater than the similarity with the image A13. Meanwhile, in the image A12, since the common region F13-3 with the image A13 is greater than the common region F10-3 with the image A10, the similarity with the image A13 is generally greater than the similarity with the image A10.

In the example illustrated in FIG. 22, in a case where the selected image by the selection processing (S106) in the registration mode includes the image A10 and the image A13 and the selected image by the selection processing (S206) in the collation mode includes the image A11, in the data collation processing (S209), the similarity between the images when the image A11 and the image A10 are collation targets can be generally higher than that of a case where the image A11 and the image A13 are collation targets. This is because, in the image A11, the common region F10-2 with the image A10 is greater than the common region F13-2 with the image A13. Therefore, in the registration data obtaining processing (S208), the processor 1 can select the registration data related to the image A10 as the collation target with the authentication data on the image A11. Accordingly, it is expected that the influence caused by fluctuation of the capturing conditions is suppressed, and true acceptance rate is suppressed. Such an effect is useful for suppressing the influence on the authentication accuracy by fluctuation of capturing conditions.

Meanwhile, in a case where the selected image by the selection processing (S106) in the registration mode includes the image A10 and the image A13 and the selected image by the selection processing (S206) in the collation mode includes the image A12, in the data collation processing (S209), the similarity between the images when the image A12 and the image A10 are collation targets can be generally higher than that of a case where the image A12 and the image A13 are collation targets. This is because, in the image A12, the common region F13-3 with the image A13 is greater than the common region F10-3 with the image A10. Therefore, in the registration data obtaining processing (S208), the processor 1 can select the registration data related to the image A13 as the collation target with the authentication data on the image A12. Accordingly, it is expected that the influence caused by fluctuation of the capturing conditions is suppressed, and true acceptance rate is suppressed. Such an effect is useful for suppressing the influence on the authentication accuracy by fluctuation of capturing conditions.

Compared to the example illustrated in FIG. 17, in the example illustrated in FIG. 22, since the separation distance R30 is greater than the separation distance R10, the following difference is seen. For example, in the example illustrated in FIG. 22, in a case where the capturing range is displaced from the image A10 to the image A13, the point of time at which the magnitude relation between the common region with the image A10 and the common region with the image A13 in each of the images A10 to A13 is switched, is earlier than that in the example illustrated in FIG. 17. In other words, in the example illustrated in FIG. 17, in the image A8 at the point of time of the fourth stage of time in the displacement having 5 stages from the image A5 to the image A9, the magnitude relation between the common region with the image A5 and the common region with the image A9 is switched. Meanwhile, in the example illustrated in FIG. 22, in the image A12 at the point of time of the third stage of time in the displacement having 4 stages from the image A10 to the image A13, the magnitude relation between the common region with the image A10 and the common region with the image A13 is switched.

In the example illustrated in FIG. 22, compared to the example illustrated in FIG. 17, the point of time at which the magnitude relation between the common region with the image A10 and the common region with the image A13 is switched is advanced, the following can be said. In other words, the common region F10-2 with the image A10 in the image A11, which is at a point of time earlier than the point of time at which the magnitude relation is switched, is greater than the common region E5-4 with the image A5 in the image A7, which is at a point of time earlier than the point of time at which the magnitude relation is switched in FIG. 17. In addition, in FIG. 22, the common region F10-3 with the image A10 in the image A12, which is at a point of time at which the magnitude relation is switched, is greater than the common region E5-4 with the image A5 in the image A8, which is at a point of time at which the magnitude relation is switched in FIG. 17. Accordingly, in the example illustrated in FIG. 22, compared to the example illustrated in FIG. 17, at the point of time at which the common region with the image A10 is large, the common region with the image A13 is greater than the common region with the image A10. In other words, in the example illustrated in FIG. 22, it is possible to switch the collation target from the image A10 to the image A13 at a stage where the degree of decrease of the common region with the image A10 is small. This is due to setting a smaller threshold value based on the separation distance as the separation distance becomes greater. Such an effect is useful for suppressing the influence on the authentication accuracy by fluctuation of capturing conditions.

EXAMPLE 2

Figure 23:
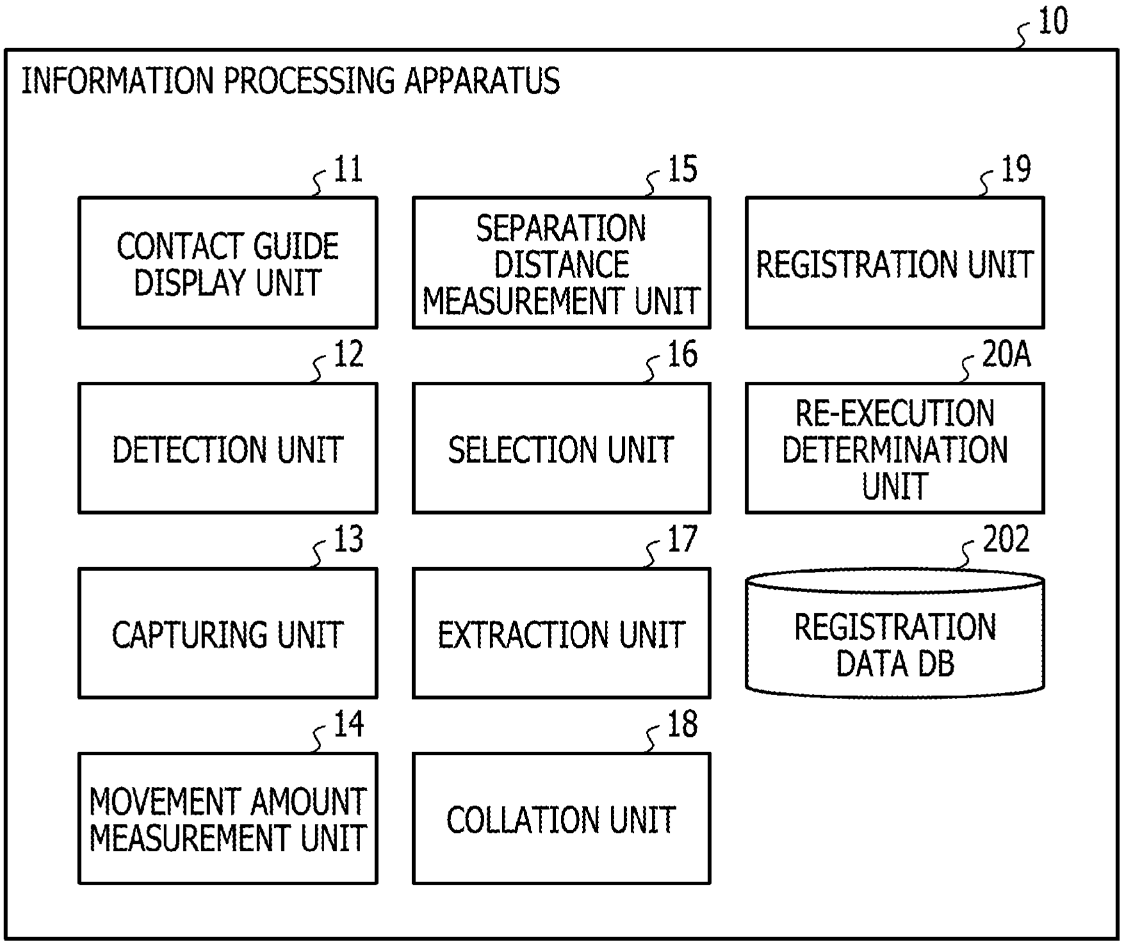
FIG. 23 is a block diagram illustrating a functional configuration of an information processing apparatus according to Example 2.

FIG. 23 is a block diagram illustrating an example of a functional configuration of the information processing apparatus 10 according to Example 2. In the information processing apparatus 10 illustrated in FIG. 23, a re-execution determination unit 20A is added in contrast to the functional configuration according to Example 1 illustrated in FIG. 3. The re-execution determination unit 20A is realized, for example, by executing the biometric authentication program 201 stored in the storage device 2 by the processor 1 of the information processing apparatus 10. In other words, by executing the biometric authentication program 201 stored in the storage device 2, the processor 1 of the information processing apparatus 10 is converted into a hardware circuit realizing each of the functional units illustrated in FIG. 23. The other configurations are the same as the functional configurations according to Example 1 illustrated in FIG. 3, and thus the description thereof will be omitted.

The re-execution determination unit 20A illustrated in FIG. 23 determines whether or not a predetermined re-execution condition is satisfied, and in a case where it is determined that the re-execution determination condition is satisfied, the contact guide displayed on the touch panel display 110 is returned to the initial position, processing that is configured to execute the capturing of the living body again is performed.

Figure 24:
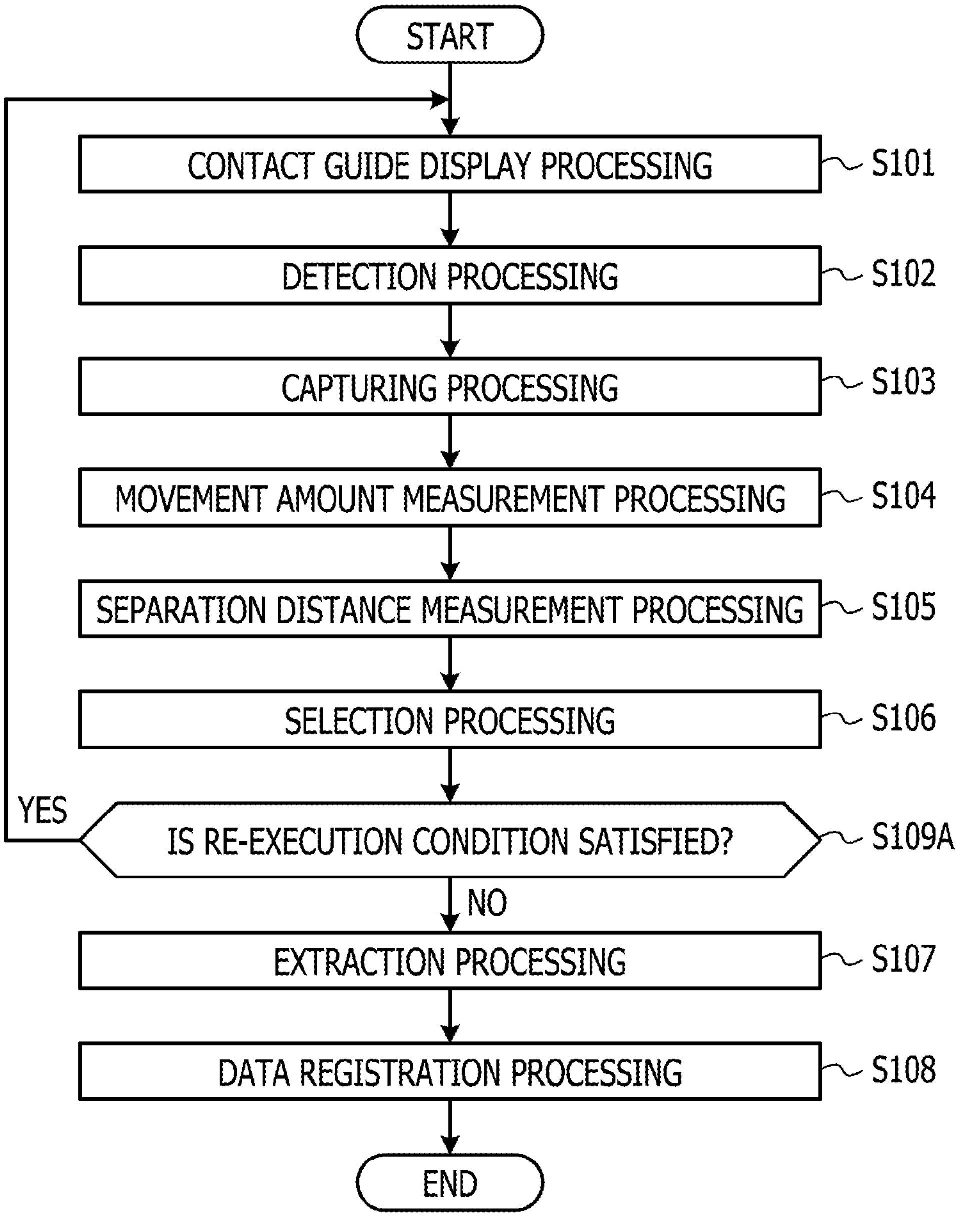
FIG. 24 is a view illustrating an example of a flow of processing in a registration mode according to Example 2.

FIG. 24 is a view illustrating an example of a flow of processing in the registration mode according to Example 2. Compared to the flow of the processing in the registration mode according to the Example 2 illustrated in FIG. 24, in the flow of the processing in the registration mode according to the Example 1 illustrated in FIG. 4, the processing (also referred to as the re-execution determination processing) by the re-execution determination unit 20A (S109A) is added between the selection processing (S106) and the extraction processing (S107).

In the flow of the processing illustrated in FIG. 24, the processor 1 determines whether or not the re-execution condition is satisfied (S109A) after the selected image is selected by the selection processing (S106). In the processing S109A, the processor 1 may determine the number of selected images selected by the selection processing (S106), for example, and may determine whether or not the number of selected images is less than a second threshold value based on the separation distance of the living body. In the processing S109A, the processor 1 may determine that the re-execution condition is satisfied (YES in S109A) in a case where the number of selected images is less than the second threshold value. Meanwhile, in the processing S109A, the processor 1 may determine that the re-execution condition is not satisfied (NO in S109A) in a case where the number of selected images is equal to or greater than the second threshold value.

In the processing S109A, the processor 1 may determine the second threshold value based on the separation distance of the living body. The second threshold value may be set to be a value that appropriately determines whether or not the number of selected images selected by the selection processing (S106) satisfies the minimum number of images (also referred to as the minimum number of images) for the biometric authentication. As described above, as the separation distance of the living body becomes greater, the capturing range per unit pixel of the biometric sensor becomes greater. In other words, as the separation distance of the living body becomes smaller, the capturing range per unit pixel of the biometric sensor becomes smaller. Therefore, as the separation distance of the living body becomes smaller, the number of times of capturing for covering the whole region of the living body becomes greater. Therefore, in the processing S109A, the processor 1 may be set so that the second threshold value becomes greater as the separation distance of the living body becomes smaller.

In the processing S109A, in a case where it is determined that the re-execution condition is satisfied (YES in S109A), the processor 1 may execute the contact guide display processing (S101) and the subsequent processing from the initial state again. At this time, the processor 1 may output a display requesting the user to re-input the contact position of the living body with a slightly lower moving speed, to the touch panel display 110. Meanwhile, in the processing S109A, in a case where it is determined that the re-execution condition is not satisfied (NO in S109A), the processor 1 may execute the extraction processing (S107) and the subsequent processing.

By adding the re-execution determination processing (S109A) in the flow of the processing illustrated in FIG. 24, in a case where the number of selected images selected by the selection processing (S106) is not set to the minimum number for the biometric authentication, it is possible to encourage the user to perform the re-input. Such an effect is useful for suppressing the influence on the authentication accuracy by fluctuation of capturing conditions.

Figure 25:
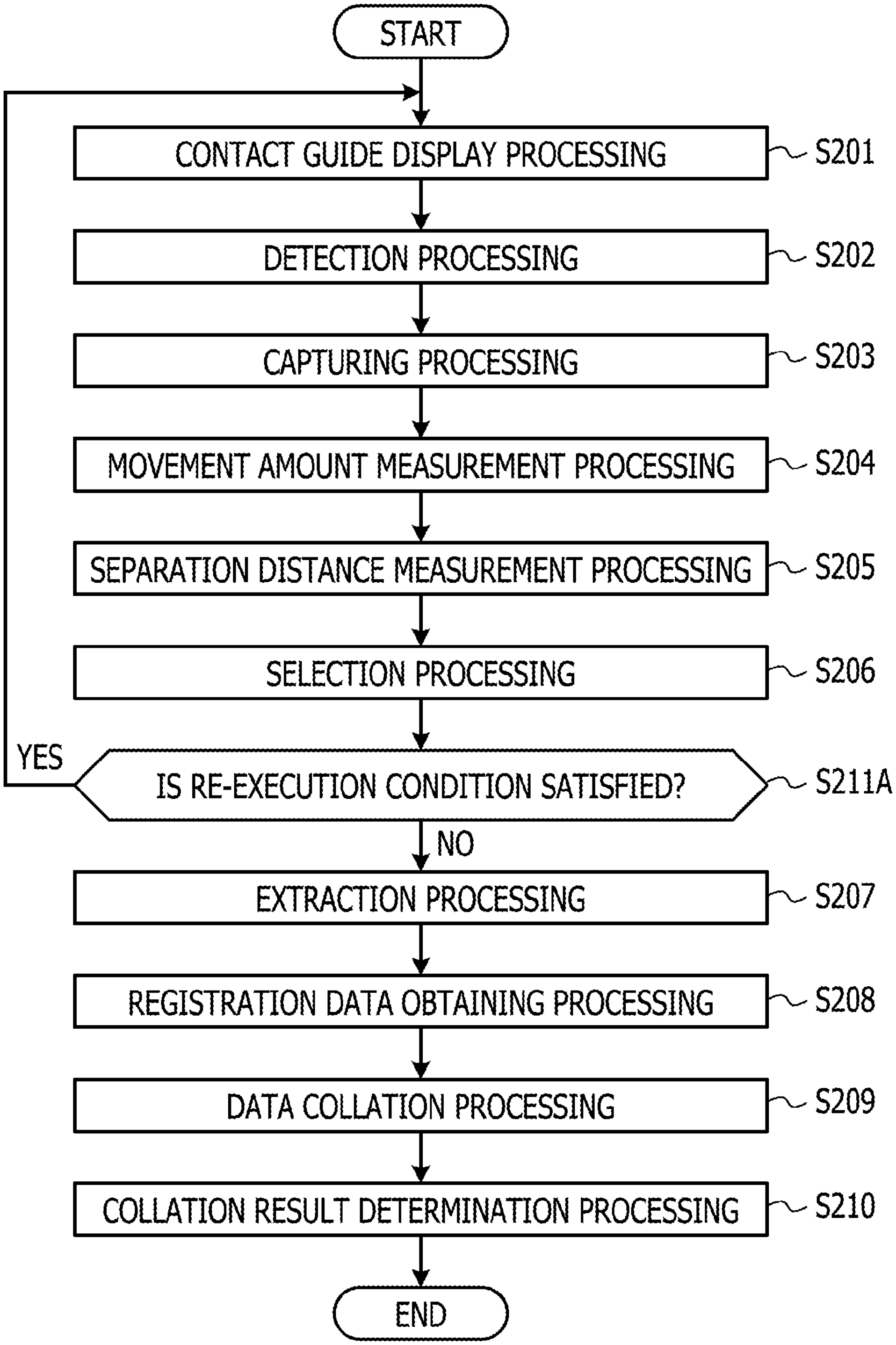
FIG. 25 is a view illustrating an example of a flow of processing in a collation mode according to Example 2.

FIG. 25 is a view illustrating an example of a flow of processing in the collation mode according to Example 2. Compared to the flow of the processing in the collation mode according to the Example 1 illustrated in FIG. 15, in the flow of the processing in the collation mode according to the Example 2 illustrated in FIG. 25, the processing (also referred to as the re-execution determination processing) by the re-execution determination unit 20A (S211A) is added between the selection processing (S206) and the extraction processing (S207).

In the flow of the processing illustrated in FIG. 25, the processor 1 determines whether or not the re-execution condition is satisfied (S211A) after the selected image is selected by the selection processing (S206). In the processing S211A, the processor 1 may determine the number of selected images selected by the selection processing (S206), for example, and may determine whether or not the number of selected images is less than a second threshold value based on the separation distance of the living body. In the processing S211A, the processor 1 may determine that the re-execution condition is satisfied (YES in S211A) in a case where the number of selected images is less than the second threshold value. Meanwhile, in the processing S211A, the processor 1 may determine that the re-execution condition is not satisfied (NO in S211A) in a case where the number of selected images is equal to or greater than the second threshold value.

In the processing S211A, the processor 1 may determine the second threshold value based on the separation distance of the living body. Similar to the second threshold value in the registration mode, the second threshold value may be set to be a value that appropriately determines whether or not the number of selected images selected by the selection processing (S206) satisfies the minimum number of images for the biometric authentication.

In the processing S211A, in a case where it is determined that the re-execution condition is satisfied (YES in S211A), the processor 1 may execute the contact guide display processing (S201) and the subsequent processing from the initial state again. At this time, the processor 1 may output a display requesting the user to re-input the contact position of the living body with a slightly lower moving speed, to the touch panel display 110. Meanwhile, in the processing S211A, in a case where it is determined that the re-execution condition is not satisfied (NO in S211A), the processor 1 may execute the extraction processing (S207) and the subsequent processing.

By adding the re-execution determination processing (S211A) in the flow of the processing illustrated in FIG. 25, in a case where the number of selected images selected by the selection processing (S206) is not set to the minimum number for the biometric authentication, it is possible to encourage the user to perform the re-input. Such an effect is useful for suppressing the influence on the authentication accuracy by fluctuation of capturing conditions.

MODIFICATION EXAMPLE 1

In the above Examples, the example of measuring the cumulative movement amount using the first movement amount in the selection processing (S106) in the registration mode and the selection processing (S206) in the collation mode has been described, however, the cumulative movement amount may be measured using the second movement amount. For example, in the processing S106-4 illustrated in FIG. 12, the processor 1 may add the second movement amount indicated in the reference supplementary information to the cumulative movement amount.

MODIFICATION EXAMPLE 2

In the above-described Examples, an example of obtaining the index value that corresponds to the separation distance of the living body based on the ratio of the first movement amount and the second movement amount in the separation distance measurement processing (S105) in the registration mode and the separation distance measurement processing (S205) in the collation mode, has been described, but the disclosure is not limited thereto. For example, the separation distance of the living body may be measured using a distance image sensor (also called a depth camera, a camera with a depth sensor). In this case, in the movement amount measurement processing (S104) and selection processing (S106), the processor 1 may use either the first movement amount or the second movement amount. For example, in the movement amount measurement processing (S104), the processor 1 may measure either the first movement amount or the second movement amount. Also, in the selection processing (S106), the processor 1 may measure the cumulative movement amount using the movement amount measured in the movement amount measurement processing (S104). The movement amount measurement processing (S204) and the selection processing (S206) in the collation mode are similar thereto. In the modification example 2, the information processing apparatus 10 may not include the touch panel display 110, and in this case, the contact guide display unit 11 and the detection unit 12 may be omitted. In other words, the contact position in the supplementary information may be replaced with a value obtained by cumulatively adding the second movement amount with the image at the start point of the moving period as an absolute standard.

MODIFICATION EXAMPLE 2

In the above-described Examples, an example of executing the selection processing (S106 and S206) in both the registration mode and the collation mode has been described, but the disclosure is not limited thereto. For example, the selection processing may be executed in one of the registration mode and the collation mode, and the selection result in one mode may be applied to the other modes.

Figure 26:
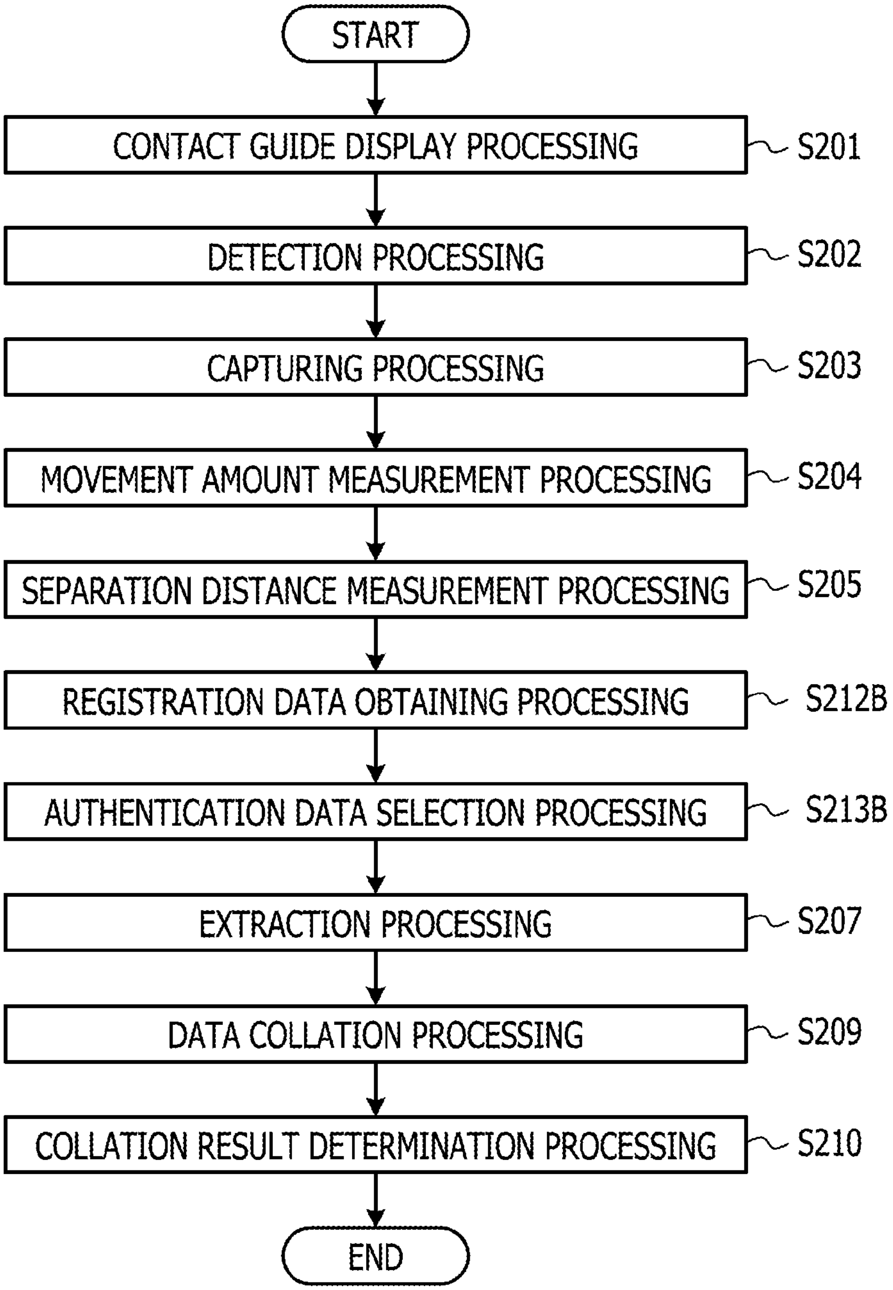
FIG. 26 is a view illustrating an example of a flow of processing in a collation mode according to a modification example 3.

FIG. 26 is a view illustrating an example of a flow of processing in the collation mode according to a modification example 3. Compared to the example illustrated in FIG. 15, in the flow of the processing in the collation mode according to the modification example 3 illustrated in FIG. 26, between the separation distance measurement processing (S205) and the extraction processing (S207), the selection processing (S206) is omitted, and the registration data obtaining processing (S212B) and the authentication data selection processing (S213B) are added. In addition, in the example illustrated in FIG. 26, compared to the example illustrated in FIG. 15, the registration data obtaining processing (S208) between the extraction processing (S207) and the data collation processing (S209) is omitted.

In the flow of the processing illustrated in FIG. 26, the processor 1 obtains an image of the living body captured in the processing S201 to the processing S205 until the contact position of the living body reaches the end point on the contact guide route, obtains the contact position of the living body that corresponds to each of the capturing points of time, measures the movement amount, or measure the separation distance of the living body. After this, the processor 1 executes the registration data obtaining processing for obtaining the related registration data from the registration data DB 202 (S212B). The registration data obtaining processing (S212B) is an example of the processing by the selection unit 16, for example.

In the processing S212B, the processor 1 may specify the related registration data based on the attribute information of the user. For example, the processor 1 may use the registration data including the attribute information that matches the attribute information of the user in the collation mode as the related registration data. The attribute information of the user at the time of the collation mode may be obtained by the input operation of the user before starting the flow of the series of the processing illustrated in FIG. 26, or may be obtained by the input operation of the user before executing the registration data obtaining processing (S212B) illustrated in FIG. 26.

In the processing S212B, in a case where a plurality of groups are registered for one piece of attribute information, the processor 1 may specify the related group based on the capturing condition obtained in the series of processing from the processing S201 to the processing S205, and may obtain the registration data of the related group from the registration data DB 202. For example, the processor 1 may set the group of the registration data including the supplementary information in which the separation distance parameter that is approximate to the separation distance of the living body indicated in the supplementary information of the image obtained in the series of the processing from the processing S201 to the processing S205 is set, as the related group. At this time, the processor 1 may use a value obtained by averaging the separation distance of the living body indicated by the supplementary information of each of the plurality of images obtained in the series of processing of processing S201 to processing S205.

The processor 1 may obtain, for example, a representative value of the separation distance in the group by using the separation distance indicated in the supplementary information of the registration data included in the group, for each group. For example, the processor 1 may use a value (also referred to as an average separation distance) obtained by averaging the separation distances indicated in the supplementary information of registration data for each group, as a representative value. Otherwise, for each group, other statistical values, such as the median of the separation distance indicated in the supplementary information of the registration data may be used.

The processor 1 executes the authentication data selection processing (S213B) for selecting the image to be used in generating the authentication data among the plurality of images obtained in the series of processing of the processing S201 to the processing S205 based on the contact position indicated in the supplementary information of the registration data obtained in the registration data obtaining processing (S212B). In the processing S213B, the processor 1 may refer to the contact position (also referred to as a reference contact position) of the living body indicated by the supplementary information of each piece of the plurality of registration data obtained in the registration data obtaining processing (S212B), and may select an image that corresponds to the supplementary information in which the contact position which is approximate to the reference contact position.

In the above-described authentication data selection processing (S213B), by selecting the image that corresponds to the position that is approximate to the contact position indicated by the supplementary information of the related registration data, there is an aspect in which the image selection is performed in the registration mode by applying the selection result by the selection processing (S106) in the registration mode. Accordingly, a processing load related to image selection in the collation mode can be reduced. Such an effect is useful in terms of improving authentication efficiency, such as shortening the time for the authentication processing.

MODIFICATION EXAMPLE 4

In the flow of the processing according to a modification example 3 illustrated in FIG. 26, an example in which the selection of the image to be used in the generation of the authentication data is performed by applying the selection result by selection processing (S106) in the registration mode, has been described, but the disclosure is not limited thereto. For example, in the flow of the processing in the registration mode illustrated in FIG. 4, the processor 1 may omit the execution of the selection processing (S106). In this case, in the extraction processing (S107), the processor 1 may set all of the plurality of images obtained at a plurality of points of time in the moving period as processing targets. In addition, in the flow of the processing in the collation mode illustrated in FIG. 15, the processor 1 executes registration data obtaining processing (S208), and thus, it is possible to select the registration data that is approximate to the contact position of the living body indicated by the supplementary information of the selected image selected by the selection processing (S206) in the collation mode. Accordingly, since it is possible to increase the variation of the capturing range related to the registration data stored in the registration data DB 202, in the registration data obtaining processing (S208) in the collation mode, it is expected that the registration data which is approximated by the capturing conditions of the authentication data is obtained. Such an effect is useful for suppressing the influence on the authentication accuracy by fluctuation of capturing conditions.

MODIFICATION EXAMPLE 5

In the above-described Examples, an example in which the information processing apparatus 10 includes the collation unit 18, the registration unit 19, and the registration data DB 202, has been described, but the disclosure is not limited thereto. For example, the information processing apparatus 10 may omit the collation unit 18, the registration unit 19, and the registration data DB 202. In this case, the information processing apparatus 10 transmits the information related to the feature data extracted by the extraction unit 17 from the image selected by the selection unit 16 to a server apparatus via a network, and thus, the server apparatus having the database that corresponds to the registration data DB 202 may execute processing that corresponds to the collation unit 18 and processing that corresponds to the registration unit 19, and may return information related to the processing result to the information processing apparatus 10. In addition, when transmitting the information related to the feature data via the network, data encrypted with information related to the feature data may be transmitted using a predetermined encryption algorithm, or data obtained by converting the information related to the feature data by predetermined function calculation having irreversibility, such as SHA1, may be transmitted.

Although the disclosed information processing apparatus, the biometric authentication method, and the biometric authentication program have been described using Examples, the invention is not limited to the above-described Examples and modification examples, and it is needless to say that various modifications and improvements are possible within the scope of the invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A biometric authentication device comprising:

a biometric sensor configured to capture at least a part of a region of a body of a user; and a processor configured to execute authentication processing configured to select a second image group used in authentication of the body from a first image group, in which the first image group includes a plurality of images that are sequentially captured by the biometric sensor during the body is moved, and in which each of the plurality of images is obtained by capturing at least a part of a region of the body, wherein, in the authentication processing, the size of a common region between images to be included in the second image group is adjusted according to a distance between the body and the biometric sensor, and the second image group is selected, according to the size of the common region, from the plurality of images included in the first image group.

2. The biometric authentication device according to claim 1, wherein the authentication processing includes:

contact guide display processing that includes displaying contact guide that indicates a position at which a part of the body is intended to come into contact with a touch panel display;

detection processing that includes detecting a contact position of the body with respect to the touch panel display;

capturing processing that includes obtaining the image of the capturing range including at least a part of the body, which is captured at a plurality of points of time within a moving period during which the contact position of the body moves along a contact guide route displayed on the touch panel display;

movement amount measurement processing that includes measuring an movement amount that indicates an amount by which the body has moved along the contact guide route, at any two points of time among the plurality of points of time within the moving period;

distance measurement processing that includes measuring the distance of the body at each of the plurality of points of time within the moving period;

selection processing that includes selecting an image that corresponds to each of the two points of time, in the image obtained in the capturing processing in a case where the movement amount in the moving period exceeds a threshold value based on the distance;

extraction processing that includes extracting biometric features from the image selected in the selection processing; and collation processing that includes biometric authentication using the biometric features.

3. The biometric authentication device according to claim 2, wherein the selection processing includes setting the threshold value to be smaller as the value of the distance becomes greater.

4. The biometric authentication device according to claim 2, wherein the movement amount measurement processing includes measuring a first movement amount of the body by using the contact position obtained in the detection processing when the body moves along the contact guide, and wherein the selection processing includes selecting images that correspond to each of the two points of time among the images obtained in the capturing processing in a case where the first movement amount in the moving period exceeds a threshold value based on the distance.

5. The biometric authentication device according to claim 2, wherein the movement amount measurement processing includes performing comparison of images with respect to a plurality of images obtained in the capturing processing at a plurality of points of time within the moving period, and measuring a second movement amount of the body by using the movement amount of the common region between images in which the common region is specified by the comparison, and wherein the selection processing includes selecting images that correspond to each of the two points of time among the images obtained in the capturing processing in a case where the second movement amount in the moving period exceeds a threshold value based on the distance.

6. The biometric authentication device according to claim 2, wherein the authentication processing further includes re-execution determination processing configured to re-execute capturing of the body by the user by displaying the contact guide on the touch panel display in the contact guide display processing, in a case where the number of images selected in the selection processing is less than the minimum number of images indicating the minimum number of images based on the distance.

7. The biometric authentication device according to claim 1, wherein, in the authentication processing, the size of the common region is determined such that the size of the common region becomes greater as the distance of the body with respect to the biometric sensor becomes greater, and the second image group from the plurality of images included in the first image group is selected according to the size of the common region.

8. A method performed by a computer for biometric authentication, the method comprising:

obtaining, by a processor of the computer, a first image group including a plurality of images that are sequentially captured by a biometric sensor configured to capture at least a part of a region of a body of a user;

obtaining, by the processor of the computer, a movement amount of the body and a distance between the body and the biometric sensor; and selecting, by the processor of the computer, a second image group from the first image group in accordance with the movement amount and the distance, the second image group including images to be used in authentication processing with respect to the body, wherein the size of a common region between images to be included in the second image group is adjusted according to the distance.

9. The method according to claim 8, further comprising:

executing, by the processor of the computer, contact guide display processing that includes displaying contact guide that indicates a position at which a part of the body is intended to come into contact with a touch panel display;

executing, by the processor of the computer, detection processing that includes detecting a contact position of the body with respect to the touch panel display;

executing, by the processor of the computer, capturing processing that includes obtaining the image of the capturing range including at least a part of the body, which is captured at a plurality of points of time within a moving period during which the contact position of the body moves along a contact guide route displayed on the touch panel display;

executing, by the processor of the computer, movement amount measurement processing that includes measuring the movement amount that indicates an amount by which the body has moved along the contact guide route, at any two points of time among the plurality of points of time within the moving period;

executing, by the processor of the computer, distance measurement processing that includes measuring the distance of the body at each of the plurality of points of time within the moving period;

executing, by the processor of the computer, selection processing that includes selecting an image that corresponds to each of the two points of time, in the image obtained in the capturing processing in a case where the movement amount in the moving period exceeds a threshold value based on the distance;

executing, by the processor of the computer, extraction processing that includes extracting biometric features from the image selected in the selection processing; and executing, by the processor of the computer, collation processing that includes biometric authentication using the biometric features.

10. The method according to claim 9, wherein the selection processing includes setting the threshold value to be smaller as the value of the distance becomes greater.

11. The method according to claim 9, wherein the movement amount measurement processing includes measuring a first movement amount of the body by using the contact position obtained in the detection processing when the body moves along the contact guide, and wherein the selection processing includes selecting images that correspond to each of the two points of time among the images obtained in the capturing processing in a case where the first movement amount in the moving period exceeds a threshold value based on the distance.

12. The method according to claim 9, wherein the movement amount measurement processing includes performing comparison of images with respect to a plurality of images obtained in the capturing processing at a plurality of points of time within the moving period, and measuring a second movement amount of the body by using the movement amount of the common region between images in which the common region is specified by the comparison, and wherein the selection processing includes selecting images that correspond to each of the two points of time among the images obtained in the capturing processing in a case where the second movement amount in the moving period exceeds a threshold value based on the distance.

13. The method according to claim 9, wherein the authentication processing further includes re-execution determination processing configured to re-execute capturing of the body by the user by displaying the contact guide on the touch panel display in the contact guide display processing, in a case where the number of images selected in the selection processing is less than the minimum number of images indicating the minimum number of images based on the distance.

14. The method according to claim 9, wherein, in the authentication processing, the size of the common region is determined such that the size of the common region becomes greater as the distance of the body with respect to the biometric sensor becomes greater, and the second image group from the plurality of images included in the first image group is selected according to the size of the common region.

15. A non-transitory computer-readable storage medium for storing a program regarding biometric authentication, the program causing a processor to execute a process, the process comprising:

obtaining a first image group including a plurality of images that are sequentially captured by a biometric sensor configured to capture at least a part of a region of a body of a user;

obtaining a movement amount of the body and a distance between the body and the biometric sensor; and selecting a second image group from the first image group in accordance with the movement amount and the distance, the second image group including images to be used in authentication processing with respect to the body, wherein the size of a common region between images to be included in the second image group is adjusted according to the distance.

* * * * *